(12) United States Patent
Miyazaki et al.

(10) Patent No.: US 12,313,642 B2
(45) Date of Patent: May 27, 2025

(54) SAMPLE RACK, ADAPTER FOR SAMPLE RACK, AND AUTOMATIC ANALYSIS DEVICE

(71) Applicant: HITACHI HIGH-TECH CORPORATION, Tokyo (JP)

(72) Inventors: Masaru Miyazaki, Tokyo (JP); Takamichi Mori, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 1003 days.

(21) Appl. No.: 17/419,320

(22) PCT Filed: Oct. 9, 2019

(86) PCT No.: PCT/JP2019/039785
§ 371 (c)(1),
(2) Date: Jun. 29, 2021

(87) PCT Pub. No.: WO2020/166127
PCT Pub. Date: Aug. 20, 2020

(65) Prior Publication Data
US 2022/0091145 A1 Mar. 24, 2022

(30) Foreign Application Priority Data
Feb. 14, 2019 (JP) .................................. 2019-024562

(51) Int. Cl.
*G01N 35/02* (2006.01)
*B01L 9/06* (2006.01)
(Continued)

(52) U.S. Cl.
CPC .............. *G01N 35/026* (2013.01); *B01L 9/06* (2013.01); *G01N 35/1002* (2013.01); *G01N 2035/00801* (2013.01); *G01N 2035/0405* (2013.01)

(58) Field of Classification Search
CPC .. G01N 35/026; G01N 35/1002; G01N 35/04; G01N 2035/00801;
(Continued)

(56) References Cited

U.S. PATENT DOCUMENTS

| 5,885,529 A | 3/1999 | Babson et al. |
| 2003/0215370 A1 | 11/2003 | Itoh et al. |

(Continued)

FOREIGN PATENT DOCUMENTS

| CN | 201689104 U | 12/2010 |
| CN | 107913752 W | 4/2018 |

(Continued)

OTHER PUBLICATIONS

Espacenet English Machine Translation of CN107913752 (Year: 2018).*

(Continued)

*Primary Examiner* — Kathryn Elizabeth Limbaugh
(74) *Attorney, Agent, or Firm* — MATTINGLY & MALUR, PC

(57) ABSTRACT

The present invention is provided with: a sample rack body in which test tubes are inserted from insertion openings; a plurality of leaf springs that are provided to the sample rack body and press and hold the test tubes; and adaptors inserted from the insertion openings. The adaptors respectively have cylindrical bodies inserted from the insertion openings. The cylindrical bodies each have formed therein notch sections which cause the corresponding leaf spring to pass through a portion at which the leaf spring is in contact with the test tube and cause the test tube having a small outer diameter than the insertion opening to be held by the leaf spring.

14 Claims, 25 Drawing Sheets

(51) Int. Cl.
*G01N 35/00* (2006.01)
*G01N 35/04* (2006.01)
*G01N 35/10* (2006.01)

(58) Field of Classification Search
CPC .... G01N 2035/0405; G01N 2035/0412; B01L 9/06; B01L 2200/023; B01L 2200/025
See application file for complete search history.

(56) References Cited

U.S. PATENT DOCUMENTS

| | | | |
|---|---|---|---|
| 2005/0281716 | A1 | 12/2005 | Belz et al. |
| 2008/0024301 | A1 | 1/2008 | Fritchie et al. |

FOREIGN PATENT DOCUMENTS

| | | |
|---|---|---|
| CN | 208420956 U | 1/2019 |
| EP | 2 988 134 A1 | 2/2016 |
| EP | 3 136 109 A1 | 3/2017 |
| JP | 2003-326176 A | 11/2003 |
| JP | 2006-053129 A | 2/2006 |
| JP | 2006-292696 A | 10/2006 |
| JP | 2009-80014 A | 4/2009 |
| JP | 2014-206443 A | 10/2014 |
| JP | 2015-200668 A | 11/2015 |

OTHER PUBLICATIONS

Espacenet English Machine Translation of CN201689104U (Year: 2010).*
International Search Report of PCT/JP2019/039785 dated Nov. 12, 2019.
Chinese Office Action received in corresponding Chinese Application No. 201980075199.5 dated Jul. 18, 2024.
Extended European Search Report received in corresponding European Application No. 19915208.3 dated Sep. 22, 2022.

* cited by examiner

SAMPLE RACK, ADAPTER FOR SAMPLE RACK, AND AUTOMATIC ANALYSIS DEVICE

TECHNICAL FIELD

The present invention relates to a specimen rack, an adapter for specimen rack, and an automatic analysis device.

BACKGROUND ART

JP-A-2006-292696 (PTL 1) describes a specimen rack including a cylindrical insertion hole (upper opening) for inserting a plurality of test tubes (specimen containers), and a spring (elastic portion) for holding the test tubes installed therein.

CITATION LIST

Patent Literature

PTL 1: JP-A-2006-292696

SUMMARY OF INVENTION

Technical Problem

However, in the specimen rack described in PTL 1, when a test tube having a small outer diameter (for example, φ13 mm) is used in the same specimen rack, the diameter (outer diameter) of the test tube is smaller than the diameter of the insertion hole into which the test tube of the specimen rack is inserted. Therefore, the test tube cannot be stably held by the spring provided in the specimen rack.

As a method of quantitatively aspirating a specimen with a probe, there is a method of directly sucking the specimen from the test tube and a cup-on method in which a specimen placed in a small cup is placed on the test tube and used. In the cup-on method, as shown in FIG. 33, the test tube 15 of φ13 mm installed in the specimen rack is tilted, and the axial center O1 of the small cup 60 is deviated from the axial center O2 of the probe 70 to be dispensed according to the length of the test tube 15. Therefore, even when the amount of the specimen SP is larger than the minimum filling amount of the small cup 60, there is a problem that the probe 70 comes into contact with the inner wall 60a of the small cup 60 when the liquid level is lowered by repeated dispensing. Since the probe 70 detects the liquid level by the change in capacitance when the probe 70 comes into contact with the liquid level, there is a concern that the liquid level may be erroneously detected by contacting the inner wall 60a of the small cup 60 before contacting the liquid level. When the liquid level is erroneously detected at a position higher than the actual liquid level, since the suction of the specimen SP is started from a position that does not reach the specimen SP, the amount required for analysis cannot be sucked into the probe 70. As a result, the amount of specimen SP required for analysis cannot be discharged into the reaction cell, resulting in an incorrect diagnosis result being output. When the probe 70 is in contact with the inner wall 60a of the small cup 60 even after the suction of the specimen SP is completed, even after the specimen SP is sucked, since the tip of the probe 70 is erroneously detected to be inside the specimen SP, the necessary alarm cannot be generated.

The present invention solves the problems of the related arts described above, and an object of the present invention is to provide a specimen rack, an adapter for specimen rack, and an automatic analysis device, which are capable of vertically holding a specimen container having a small outer diameter.

Solution to Problem

The present invention includes: a specimen rack main body into which a specimen container is inserted through an upper opening; a plurality of elastic portions that are provided in the specimen rack main body and press and hold the specimen container; and an adapter that is inserted through the upper opening, in which the adapter includes a cylinder that is inserted through the upper opening, and the cylinder includes a notch portion that is formed in a portion where each of the elastic port ions comes into contact with the specimen container such that the elastic portion penetrates into the notch portion and holds another specimen container having a smaller outer diameter than the upper opening.

Advantageous Effects of Invention

According to the present invention, it is possible to provide a specimen rack, an adapter for specimen rack, and an automatic analysis device capable of vertically holding a specimen container having a small outer diameter.

DESCRIPTION OF EMBODIMENTS

Hereinafter, embodiments of the present invention will be described in detail with reference to the drawings as appropriate. The present invention relates to an automatic analysis device that analyzes concentration or the like of a certain component in a liquid specimen such as blood, urine, or the like. In particular, the present invention relates to an adapter for specimen rack applicable for specimen containers having different outer diameters in a specimen transport rack (hereinafter referred to as a specimen rack) for simultaneously transporting a plurality of specimen containers accommodating specimens, and a specimen rack using the same.

Figure 1:
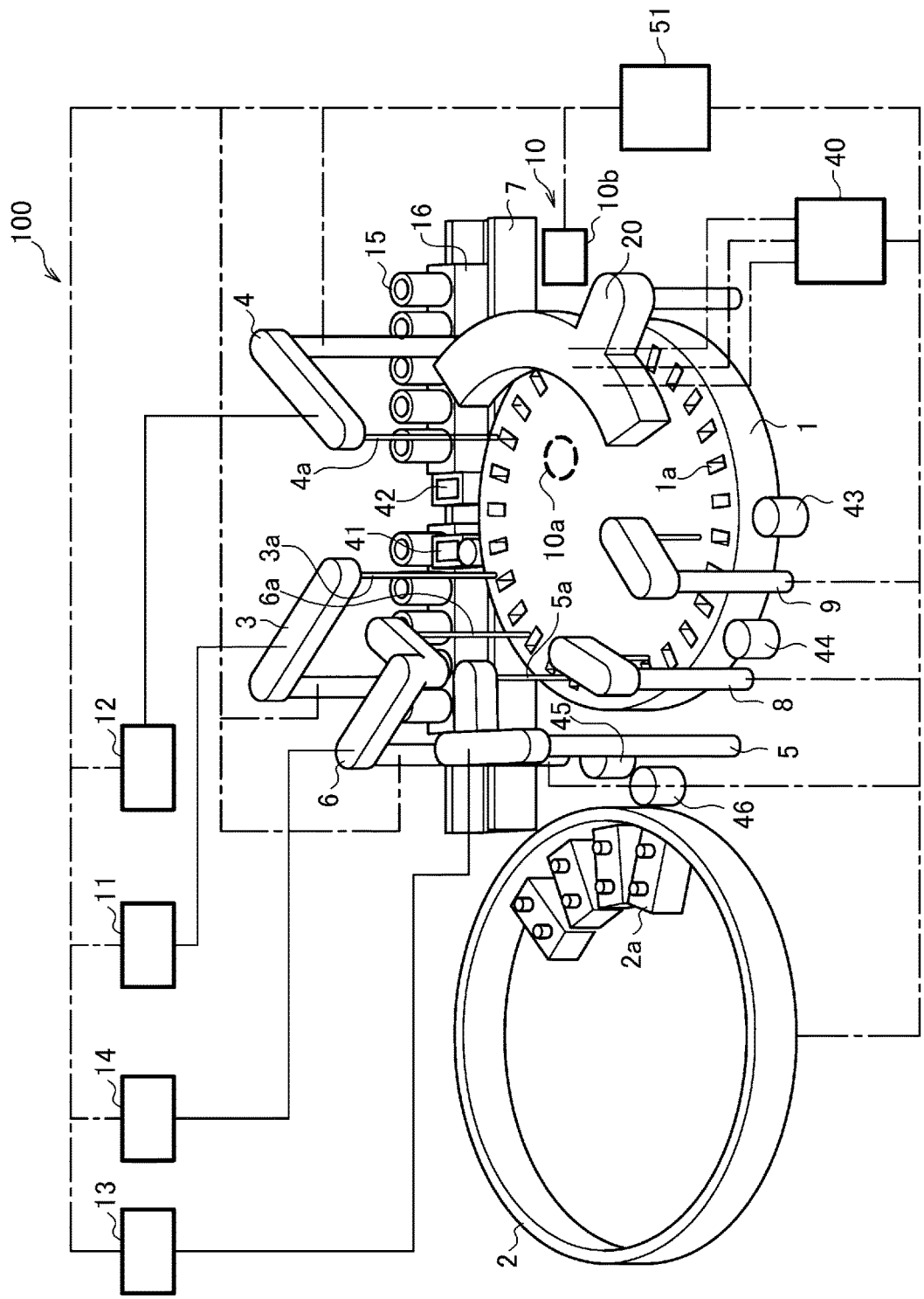
FIG. 1 is an overall configuration diagram illustrating an automatic analysis device.

FIG. 1 is an overall configuration diagram illustrating an automatic analysis device according to an embodiment. Note that FIG. 1 schematically illustrates the automatic analysis device.

As shown in FIG. 1, the automatic analysis device 100 is an apparatus that dispenses and allows a specimen and a reagent to react in a plurality of reaction containers 1a, and measures the reacted liquid. The automatic analysis device 100 is configured to include a reaction disk 1, a reagent disk 2, sample dispensing mechanisms 3 and 4, reagent dispensing mechanisms 5 and 6, a specimen transport mechanism 7 (transport mechanism), stirring mechanisms 8 and 9, an analyzing unit 10, and a cleaning mechanism 20. In FIG. 1, the illustration of the small cup is omitted.

The reaction disk 1 is configured by arranging the plurality of reaction containers 1a on a circumference. The specimen transport mechanism 7, that moves a specimen rack 16 on which a test tube 15 (specimen container) is placed, is installed in the vicinity of the reaction disk 1. The test tube 15 is made of resin, for example, and contains a test specimen (specimen) such as blood or the like, and is carried by the specimen transport mechanism 7 while being placed on the specimen rack 16. A known mechanism may be adopted as the specimen transport mechanism 7. For example, a hook is caught in a concave portion formed in the specimen rack 16, and the hook is rotated by an electric motor such that the specimen rack 16 is transported in a straight line.

A plurality of reagent bottles 2a can be placed on the reagent disk 2 on the circumference. The reagent disk 2 is kept cold.

The sample dispensing mechanisms 3 and 4 are rotatable and vertically movable, and are installed between the reaction disk 1 and the specimen transport mechanism 7.

The sample dispensing mechanism 3 includes a sample probe 3a to which a syringe 11 for specimen is connected. The sample probe 3a moves along an arc around the axis of rotation of the sample dispensing mechanism 3, and dispenses the specimen from the specimen contained in the test tube 15 into the reaction container 1a.

The sample dispensing mechanism 4 includes a sample probe 4a to which a syringe 12 for specimen is connected. The sample probe 4a moves along an arc around the axis of rotation of the sample dispensing mechanism 4, and dispenses the specimen from the specimen contained in the test tube 15 into the reaction container 1a.

The reagent dispensing mechanisms 5 and 6 are rotatable and vertically movable, and are installed between the reaction disk 1 and the reagent disk 2.

The reagent dispensing mechanism 5 includes a reagent probe 5a to which a reagent syringe 13 is connected. The reagent probe 5a moves along an arc around the axis of rotation, accesses the reagent disk 2, and dispenses the reagent from the reagent bottle 2a into the reaction container 1a.

The reagent dispensing mechanism 6 includes a reagent probe 6a to which a reagent syringe 14 is connected. The reagent probe 6a moves along an arc around the axis of rotation, accesses the reagent disk 2, and dispenses the reagent from the reagent bottle 2a into the reaction container 1a.

The stirring mechanisms 8 and 9 are installed around the reaction disk 1. The stirring mechanisms 8 and 9 stir the reagent and the specimen in the reaction container 1a to prepare a mixed solution (reaction liquid).

The analyzing unit 10 is installed in the vicinity of the reaction disk 1. The analyzing unit 10 includes a light source 10a and a spectrophotometer 10b for irradiating the mixed solution (reaction solution) in the reaction container 1a with light and measuring the absorbance thereof, for example. The light source 10a is arranged inside the reaction container 1a in the radial direction. The spectrophotometer 10b is arranged outside the reaction container 1a in the radial direction.

The cleaning mechanism 20 cleans the measured reaction container 1a, and includes a cleaning pump 40 connected thereto. Cleaning tanks 41, 42, 43, 44, 45 and 46 are installed in the operating range of the sample dispensing mechanisms 3 and 4, the reagent dispensing mechanisms 5 and 6, and the stirring mechanisms 8 and 9, respectively. The cleaning tanks 43 and 44 are for the stirring mechanisms. The cleaning tanks 45 and 46 are for the reagent dispensing mechanisms.

A controller 51 (control device) is configured to include a CPU board equipped with a central processing unit (CPU), a read only memory (ROM), a random access memory (RAM), and the like, an input and output interface board, and the like. The controller 51 is electrically connected to the reaction disk 1, the reagent disk 2, the sample dispensing mechanisms 3 and 4, the reagent dispensing mechanisms 5 and 6, the stirring mechanisms 8 and 9, and the analyzing unit 10.

The analysis process of the test specimen by the automatic analysis device 100 configured as described above is generally performed according to the following procedure. First, the specimen rack 16 is transported near the reaction disk 1 by the specimen transport mechanism 7. Then, the specimen in the test tube (specimen container) 15 placed on the specimen rack 16 is dispensed into the reaction container 1a on the reaction disk 1 by the sample probe 3a of the sample dispensing mechanism 3.

Then, the reagent to be used for the analysis is dispensed from the reagent bottle 2a on the reagent disk 2 into the reaction container 1a, to which the specimen was previously dispensed, by the reagent probe 5a of the reagent dispensing mechanism 5 or the reagent probe 6a of the reagent dispensing mechanism 6. Subsequently, the specimen and the reagent in the reaction container 1a are stirred by the stirring mechanisms 8 and 9 to form a mixed solution.

Then, the light from the light source 10a is transmitted through the reaction container 1a containing the mixed solution, and the luminous intensity of the transmitted light is measured by the spectrophotometer 10b. The luminous intensity measured by the spectrophotometer 10b is transmitted to the controller 51 via an A/D converter and an interface. The controller 51 performs an operation to calculate the concentration or the like of a predetermined component of an analysis item according to the reagent from the absorbance of the mixed solution (reaction solution), for example. Then, the controller 51 displays the obtained measurement result on a display unit (not shown) or the like.

Figure 33:
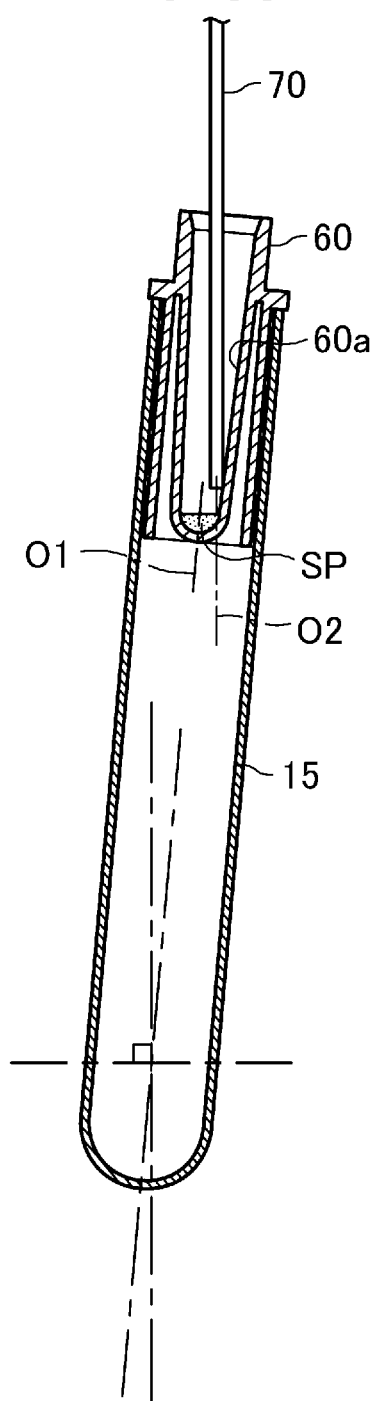
FIG. 33 is a cross-sectional view illustrating erroneous detection in a small cup when a test tube is tilted.

Meanwhile, as mentioned in the technical problem above, when the test tube 15 is tilted with respect to the axial center of the sample probe 3a, the axial center of the small cup 60 (see FIG. 33) placed on the test tube 15 and the axial center of the sample probe 3a are deviated from each other. Therefore, there is a possibility that the liquid level in the small cup 60 may be erroneously detected, and a predetermined amount required for analysis cannot be sucked into the sample probe 3a. As a result, the amount of the specimen SP (see FIG. 33) required for the analysis cannot be discharged into the reaction container 1a, and an erroneous diagnosis result is output. Therefore, the first to seventh embodiments illustrated below have been achieved, providing an adapter for specimen rack for correcting the deviation between the axial center of the sample probe 3a and the axial center of the small cup 60.

First Embodiment

Figure 2:
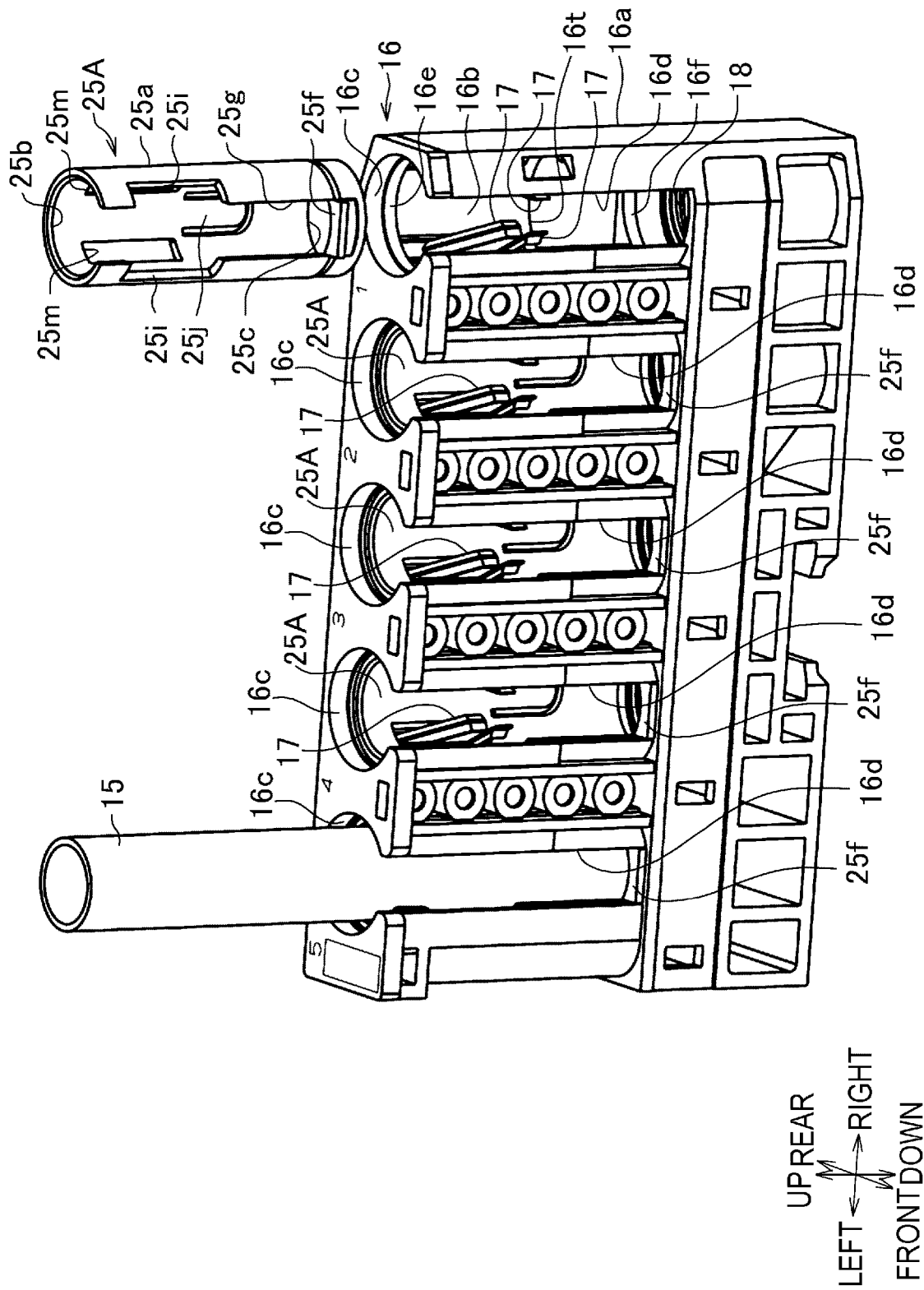
FIG. 2 is a perspective view illustrating a specimen rack where an adapter according to a first embodiment is provided.

FIG. 2 is a perspective view illustrating a specimen rack where an adapter according to a first embodiment is provided. FIG. 2 shows a state where an adapter 25A for specimen rack (hereinafter referred to as an adapter) is mounted on the specimen rack 16 and the adapter 25A at the right end of the drawing is separated from the specimen rack 16. FIG. 2 shows a state where a test tube 15 (another specimen container) is mounted on the left end of the specimen rack 16 in the drawing, having a smaller diameter (for example, an outer diameter of 13 mm) than that of the test tube (for example, a specimen container having an outer diameter of 16 mm, hereinafter referred to as a standard test tube) corresponding to the specimen rack 16. That is, when using the specimen rack 16 without attaching the adapter 25A, the standard test tube can be vertically attached to the specimen rack 16.

As shown in FIG. 2, the adapter 25A according to the first embodiment includes a cylinder 25a having a cylindrical shape. The cylinder 25a is made of an elastically deformable material such as resin. The cylinder 25a has openings 25b and 25c open at an upper end and a lower end in the axial direction, respectively. The first embodiment has a structure in which the test tube 15 is held by using a plate spring 17 provided in the specimen rack 16.

The adapter 25A is mounted on the specimen rack 16 by inserting the test tube 15 through an insertion hole 16c (upper opening) formed on an upper surface of the specimen rack 16.

The specimen rack 16 includes a specimen rack main body 16a made of resin. An insertion hole 16c into which the test tube 15 is inserted is formed on the upper surface of the specimen rack main body 16a. The specimen rack main body 16a includes an accommodation portion 16b in which the test tube 15 is held at a position corresponding to each insertion hole 16c. The accommodation portions 16b are formed in a substantially columnar shape, and are arranged linearly and at equal intervals in the left and right direction (transport direction). The insertion hole 16c is located at the upper end of the specimen rack main body 16a and in communication with the accommodation portion 16b. The insertion hole 16c is formed to have substantially the same diameter as the standard test tube (specimen container). That is, the entire outer circumferential surface of the standard test tube can be inserted into and separated from the specimen rack 16 while being in contact with the entire inner circumferential surface of the insertion hole 16c.

A side opening 16d is formed on a front surface (front surface) of the specimen rack main body 16a along the axial direction of the accommodation portion 16b. The side opening 16d is formed with a predetermined width downward from the insertion hole 16c at the upper end. The width of the side opening 16d is formed to be smaller than an outer diameter of the test tube 15. As described above, by forming the side opening 16d, the accommodation portion 16b and the insertion hole 16c are formed in a substantially C shape in a top view (cross-sectional view). The predetermined width is a width at which the bar code attached to the standard test tube and the test tube 15 can be read.

The plate spring 17 (elastic portion) for holding the standard test tube is provided on a circumferential wall surface of the accommodation portion 16b. A plurality of plate springs 17 (at 4 locations in the present embodiment) are provided at intervals in the circumferential direction (only a part of them is shown in FIG. 2).

An upper circumferential surface portion 16e into which the upper end portion of the adapter 25A is fitted is formed on the upper portion of the accommodation portion 16b. A lower circumferential surface portion 16f into which the lower end portion of the adapter 25A is fitted is formed in the lower portion of the accommodation portion 16b. As a result, the adapter 25A is stably held in the specimen rack 16 by the upper circumferential surface portion 16e and the lower circumferential surface portion 16f.

On a bottom side of the accommodation portion 16b, a retaining portion 18 for preventing the standard test tube from rotating during transport is provided. The retaining portion 18 is formed of an elastic material such as rubber. The retaining portion 18 corresponds to both the standard test tube and the test tube 15. As described above, by providing the retaining portion 18, the standard test tube and the test tube 15 are prevented from rotating when the specimen rack 16 is transported. As a result, the bar codes provided in the standard test tube or the test tube 15 can be maintained within the side opening 16d, thereby preventing an error in reading the bar codes.

Figure 3:
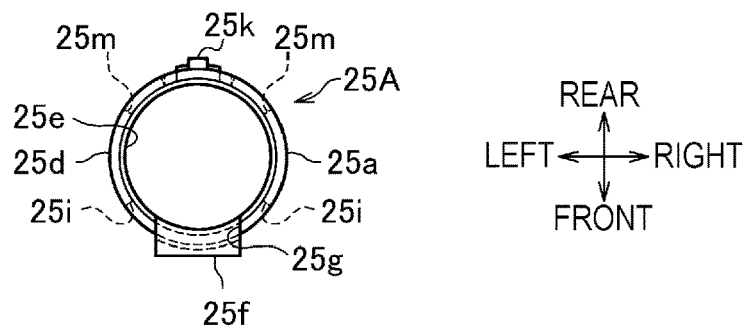
FIG. 3 is a top view illustrating the adapter according to the first embodiment.

FIG. 3 is a top view illustrating the adapter according to the first embodiment.

As shown in FIG. 3, the adapter 25A includes the cylinder 25a having a substantially cylindrical shape. The cylinder 25a has an outer circumferential surface 25d having an outer diameter substantially the same as the inner diameter of the insertion hole 16c of the specimen rack 16 (see FIG. 2). The cylinder 25a has an inner circumferential surface 25e having an inner diameter that is substantially the same as the outer diameter of the test tube 15 or slightly larger than the outer diameter of the test tube 15.

The cylinder 25a includes a rotation preventing plate 25f (protrusion portion) that is fitted to the side opening 16d (see FIG. 2), to prevent the adapter 25A from rotating in the accommodation portion 16b. A radial outer side of the rotation preventing plate 25f is formed in a substantially rectangular shape in a top view, and protrudes outward in the radial direction from the outer circumferential surface 25d. The inside of the rotation preventing plate 25f is formed in a curved surface shape to have the same curvature as the inner circumferential surface 25e.

Figure 4:
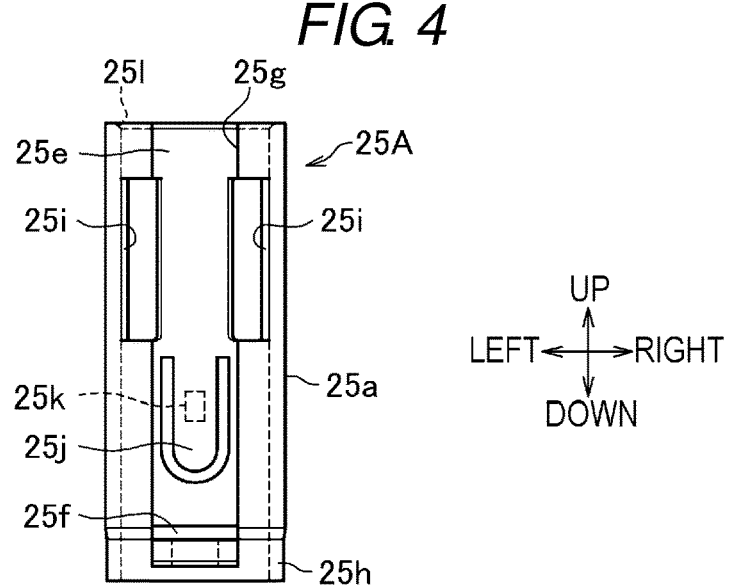
FIG. 4 is a front view illustrating the adapter according to the first embodiment.

FIG. 4 is a front view illustrating the adapter according to the first embodiment.

As shown in FIG. 4, a slit 25g that overlaps with the side opening 16d of the specimen rack 16 (see FIG. 2) is formed on a front surface of the cylinder 25a. The slit 25g is formed with the same width and substantially the same height (length in the axial direction) as the side opening 16d. The rotation preventing plate 25f is located at the lower end of the slit 25g.

As described above, the cylinder 25a is formed in a substantially C shape in the top view (round-cut cross-sectional view) in the portion where the slit 25g is formed. The cylinder 25a is formed in a substantially circular shape in a round-cut cross-sectional view below the rotation preventing plate 25f. That is, the cylinder 25a is not formed to have a substantially C shape throughout the entire body from the upper to lower ends in the axial direction, but the lower end includes an annular portion 25h that is substantially circular. With such a shape, the shape of the cylinder 25a is prevented from being deformed excessively (for example, collapse of the cylinder 25a).

The cylinder 25a is formed with notch portions 25i and 25i (plate spring passing portions) through which the plate spring 17 penetrates when the adapter 25A is mounted on the specimen rack 16 (see FIG. 2). The notch portions 25i have a rectangular shape and are formed on both the left and right sides of the slit 25g. The notch portions 25i have the same shape as each other and are notched in a concave shape from an edge of the slit 25g.

The cylinder 25a includes a downward plate portion 25j extending in the axial direction (vertical direction in the drawing) and having a free end on a lower side. The downward plate portion 25j is formed into a tongue shape by notching the circumferential wall of the cylinder 25a in a U shape. A retaining protrusion 25k is formed on an outer surface of the downward plate portion 25j. The retaining protrusion 25k is formed substantially at the center of the axial length dimension of the downward plate portion 25j. The downward plate portion 25j is located between the notch portion 25i and the rotation preventing plate 25f in the front view.

A taper 25l of which diameter increases toward the upper end is formed at the upper end of the inner circumferential surface 25e of the cylinder 25a. As described above, by forming the taper 25l, when the test tube 15 (see FIG. 2) is inserted from above, the test tube 15 can be easily guided into the adapter 25A.

Figure 5:
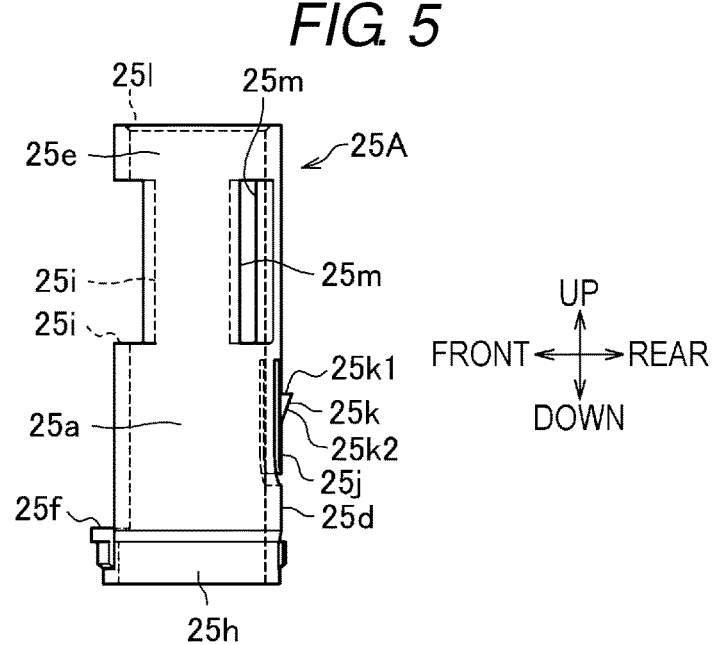
FIG. 5 is a side view illustrating the adapter according to the first embodiment.

FIG. 5 is a side view illustrating the adapter according to the first embodiment.

As shown in FIG. 5, the cylinder 25a is formed with notch portions (plate spring through holes) 25m and 25m through which the plate springs 17 penetrate when the adapter 25A is mounted on the specimen rack 16. The notch portions 25m and 25m have a rectangular shape and are formed apart from each other on both left and right sides (in FIG. 5, the back side and the front side in the vertical direction of the paper surface). Compared to the notch portion 25i having a shape that is one side open, the notch portion 25m has a quadrangular shape surrounded on all four sides. The notch portion 25m is formed at the same height position as the notch portion 25i. The notch portion 25m is arranged at a position facing the notch portion 25i with the radial center of the cylinder 25a interposed therebetween (see FIG. 3).

The outer surface of the downward plate portion 25j has a shape along the outer circumferential surface 25d of the cylinder 25a. The retaining protrusion 25k protrudes outward from the outer circumferential surface 25d. The retaining protrusion 25k includes a horizontal surface portion 25k1 extending toward the rear side in the horizontal direction at the upper end, and an inclined surface portion 25k2 extending from the leading end of the horizontal surface portion 25k1 toward the outer circumferential surface 25d.

As described above, by providing the retaining protrusion 25k on the downward plate portion 25j, when the adapter 25A is inserted through the insertion hole 16c of the specimen rack 16 (see FIG. 2), the inclined surface portion 25k2 abuts the insertion hole 16c of the specimen rack 16, and the downward plate portion 25j is bent inward. Then, when the adapter 25A is further inserted in the state where the downward plate portion 25j is bent and the retaining protrusion 25k is located at the opening 16t formed in the accommodation portion 16b (see FIG. 2), the downward plate portion 25j is elastically returned. As a result, by locating the horizontal surface portion 25k1 of the retaining protrusion 25k facing the edge of the opening 16t, the adapter 25A is prevented from being separated from the specimen rack 16. As a result, when the test tube 15 is inserted and separated, the adapter 25A is prevented from moving up and down in the specimen rack 16 to cause the adapter 25A to be unexpectedly separated from the specimen rack 16.

Figure 6:
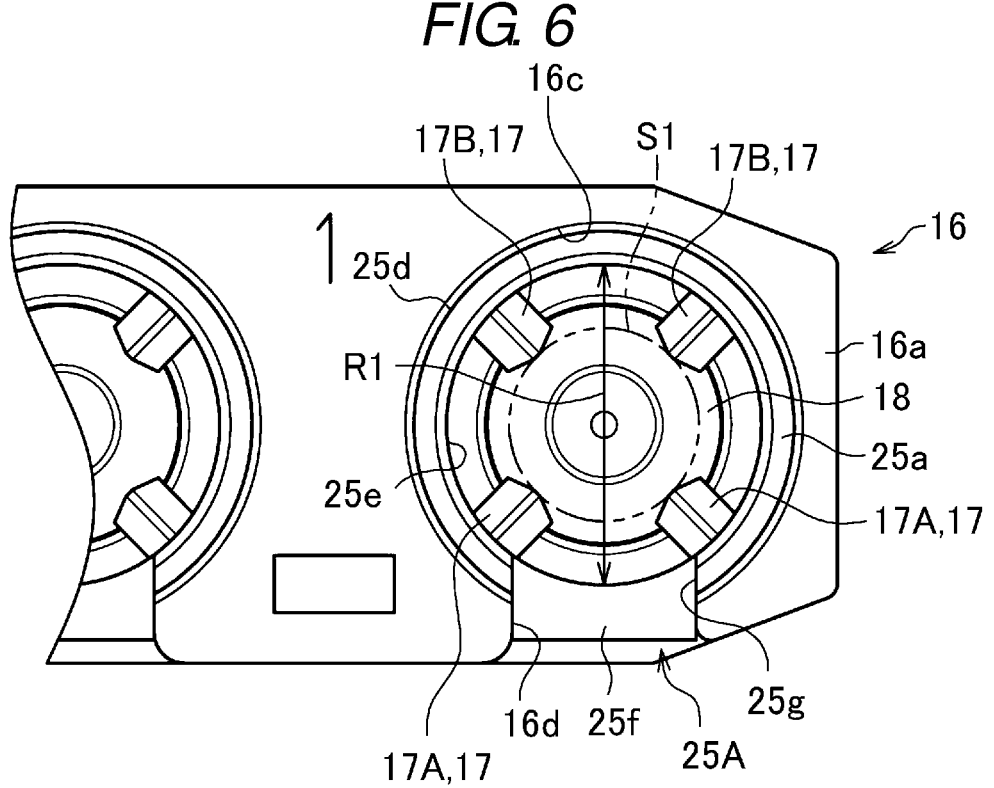
FIG. 6 is a top view illustrating a state where the adapter is attached to the specimen rack.

FIG. 6 is a top view illustrating a state where the adapter is attached to the specimen rack. Note that FIG. 6 illustrates a state where the test tube 15 is not mounted.

As shown in FIG. 6, the adapter 25A is held in the accommodation portion 16b of the specimen rack 16 (see FIG. 2). Here, the plate springs 17A (17) and 17A (17) provided on the front side of the specimen rack 16 penetrate the notch portions 25i and 25i of the adapter 25A (see FIGS. 2 to 5) and protrude to the inside (inner diameter side) of the cylinder 25a. The plate springs 17B (17) and 17B (17) provided on the back side of the specimen rack 16 penetrate the notch portions 25m and 25m formed in the adapter 25A (see FIGS. 2, 3 and 5) and protrude to the inside (inner diameter side) of the cylinder 25a. That is, the cylinder 25a is formed with notch portions 25i, 25i, 25m, and 25m at positions facing the plate springs 17, 17, 17, and 17. Therefore, the plate springs 17A, 17A, 17B, and 17B protrude into a state same as when the adapter 25A is not mounted on the specimen rack 16.

When the adapter 25A is mounted on the specimen rack 16, the adapter 25A is pushed into the accommodation portion 16b through the insertion hole 16c with the rotation preventing plate 25f of the adapter 25A fitted to the side opening 16d of the specimen rack 16. As a result, the adapter 25A is slidably moved without rotating while the rotation preventing plate 25f is slid on both ends of the side opening 16d. Here, each plate spring 17 is pressed by the outer circumferential surface 25d of the cylinder 25a such that the plate spring 17 is bent and deformed outward in the radial direction. Then, when the adapter 25A is pushed in until the notch portions 25i, 25i, 25m, and 25m (see FIGS. 3 to 5) reach the position of the plate spring 17, the plate spring 17 is elastically returned to the state shown in FIG. 6.

Figure 7:
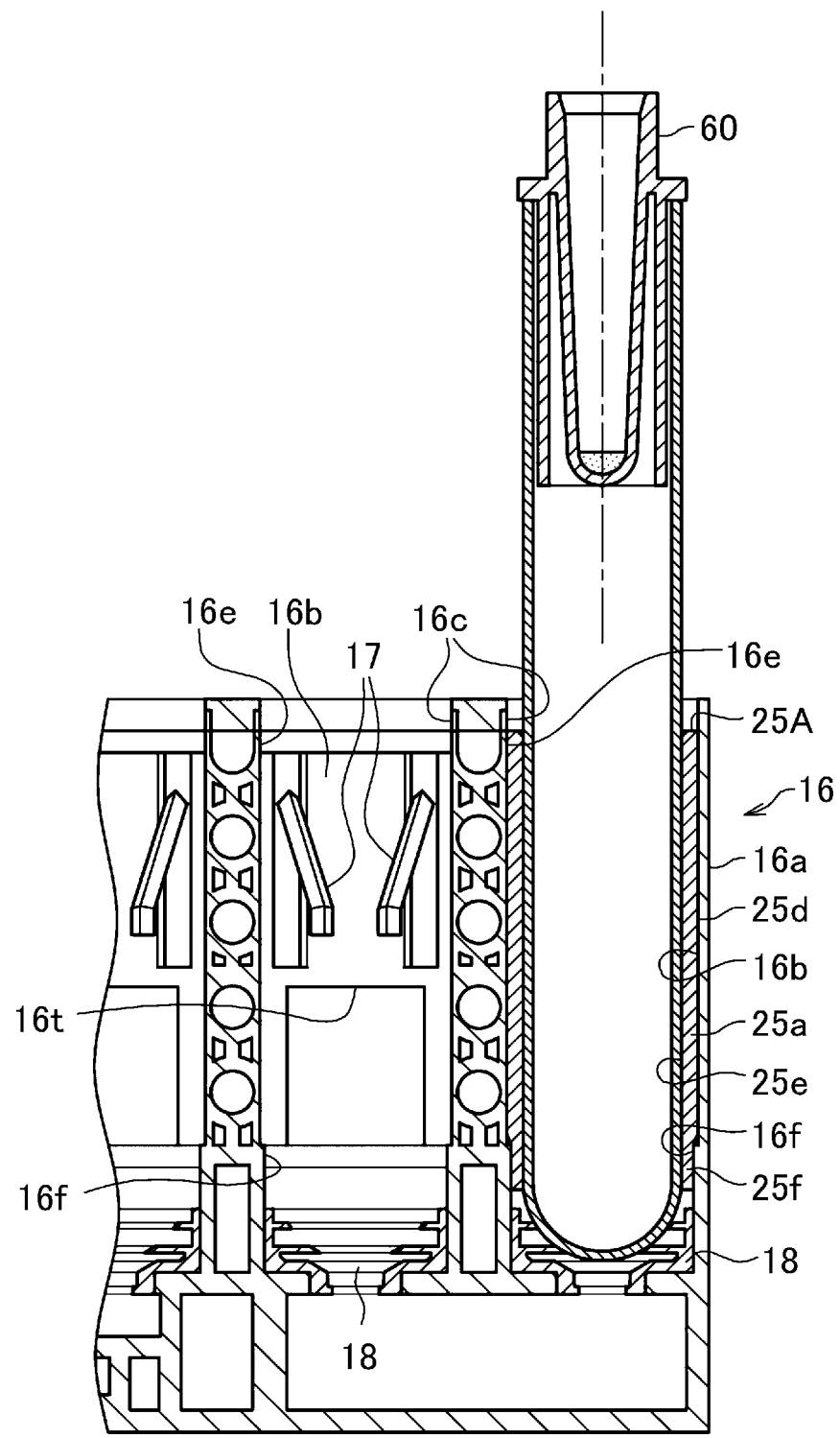
FIG. 7 is cross-sectional view illustrating a state where a test tube having a small cup mounted thereon is attached to the specimen rack to which the adapter is attached.

FIG. 7 is a cross-sectional view illustrating a state where a test tube including a small cup mounted thereon is attached to the specimen rack to which the adapter is attached.

As shown in FIG. 7, when the adapter 25A is mounted on the specimen rack 16, the outer circumferential surface 25d of the cylinder 25a comes into surface contact with the inner circumferential wall surface of the accommodation portion 16b of the specimen rack main body 16a. The upper end portion of the outer circumferential surface 25d of the adapter 25A is fitted to the upper circumferential surface portion 16e of the specimen rack main body 16a. The annular portion 25h at the lower end of the adapter 25A is fitted to the lower circumferential surface portion 16f of the specimen rack main body 16a.

When the test tube 15 having a small outer diameter is inserted into the specimen rack 16 to which the adapter 25A is mounted, the outer circumferential surface of the test tube 15 is held in surface contact with the inner circumferential surface 25e of the cylinder 25a. That is, by inserting the cylinder 25a of the adapter 25A, the gap formed between the test tube 15 and the specimen rack main body 16a can be eliminated (can be narrowed). As a result, the gap between the test tube 15 and the adapter 25A where the test tube 15 is tilted can be eliminated as much as possible.

For example, the test tube 15 of φ13 mm is inserted into the specimen rack 16 without the adapter 25A in which the test tube of φ16 mm can be inserted into the insertion hole 16c. Here, when the axial center of the accommodation portion 16b (upper circumferential surface portion 16e and lower circumferential surface portion 16f) of the specimen rack 16 and the axial center of the test tube 15 are aligned, a gap of 1.5 mm is formed between the outer circumferential surface of the test tube 15 and the inner circumferential surface of the insertion hole 16c. The gap of 1.5 mm is a gap through which the test tube 15 can be tilted.

Therefore, in the first embodiment, by attaching the adapter 25A, the gap between the specimen rack 16 and the test tube 15 is eliminated as much as possible. As a result, the test tube 15 can be installed to stand vertically (so that the axial direction of the test tube 15 faces the vertical direction). For example, for the test tube of φ13 mm, the inner diameter R1 of the adapter 25A (see FIG. 6) is set to φ13.3 mm, so that the gap between the test tube 15 and the adapter 25A can be made into a minute gap of 0.15 mm. By forming the notch portions 25i, 25m capable of penetrating the plate spring 17 in the adapter 25A, the test tube 15 can be held by the plate spring 17 originally provided in the specimen rack 16.

As described above, by attaching the adapter 25A to the specimen rack 16, the gap between the inner circumferential surface 25e (inner diameter R1) of the adapter 25A and the outer circumferential surface of the test tube 15 can be eliminated as much as possible, and the room where the test tube 15 can be tilted can be reduced. The test tube 15 can be stably held by pressing and holding the outer circumferential surface of the test tube 15 by the plate springs 17 provided on the specimen rack 16. The plate springs 17 can hold the test tube up to a size S1 (see the alternate long and short dash line in FIG. 6) with which the plate springs 17 come into contact.

As described above, the specimen rack 16 according to the first embodiment includes the specimen rack main body 16a into which the standard test tube (for example, the test tube of φ16 mm) is inserted through the insertion hole 16c, the plate springs 17 (17A, 17A, 17B, and 17B) provided on the specimen rack main body 16a to press and hold the standard test tube, and the adapter 25A inserted through the insertion hole 16c. The adapter 25A includes the cylinder 25a that is inserted through the insertion hole 16c. The cylinder 25a is formed with the notch portions 25i, 25i, 25m, and 25m through which the plate springs 17 penetrate such that the test tube 15 (for example, the test tube of φ13 mm) having an outer diameter smaller than that of the insertion hole 16c is pressed by the plate springs 17 (see FIG. 2) at the portions where the plate springs 17, 17, 17, and 17 come into contact with the standard test tube. Accordingly, the gap formed between the specimen rack main body 16a and the test tube 15 can be made as small as possible by the cylinder 25a, and the test tube 15 can be prevented from being tilted. By holding the test tube 15 by the plate springs 17 penetrating the notch portions 25i and 25m, the test tube 15 can be held in the specimen rack main body 16a in a vertical (standing) state. As a result, when the small cup 60 (see FIG. 7) is placed on the test tube 15 by the cup-on method and used, the axial center of the sample probe 3a (see FIG. 1) can be aligned with the axial center of the small cup 60 (see the alternate long and short dash line in FIG. 7). As a result, the liquid level in the small cup 60 can be accurately detected, and a predetermined amount required for analysis can be sucked into the sample probe 3a.

According to the first embodiment, by using the plate springs 17, which are originally provided in the specimen rack 16, as the elastic portions for supporting the test tube 15, the shape of the adapter 25A can be simplified and the manufacturing cost of the adapter 25A can be reduced.

According to the first embodiment, on the outer circumferential surface 25d of the cylinder 25a, the retaining protrusion 25k is formed, which engages the cylinder 25a with the specimen rack main body 16a to prevent the cylinder 25a from separating from the specimen rack main body 16a. Accordingly, the adapter 25A is prevented from being unexpectedly separated from the specimen rack main body 16a.

According to the first embodiment, the cylinder 25a includes the slit 25g formed along the side opening 16d of the specimen rack main body 16a, and the rotation preventing plate 25f (protrusion portion) that protrudes toward the side opening 16d and fits with the side opening 16d (see FIG. 2). Accordingly, for example, since the slit 25g does not rotate with respect to the side opening 16d when the specimen rack 16 is transported, the reading of the barcode attached to the test tube 15 is not hindered.

Second Embodiment

Figure 8:
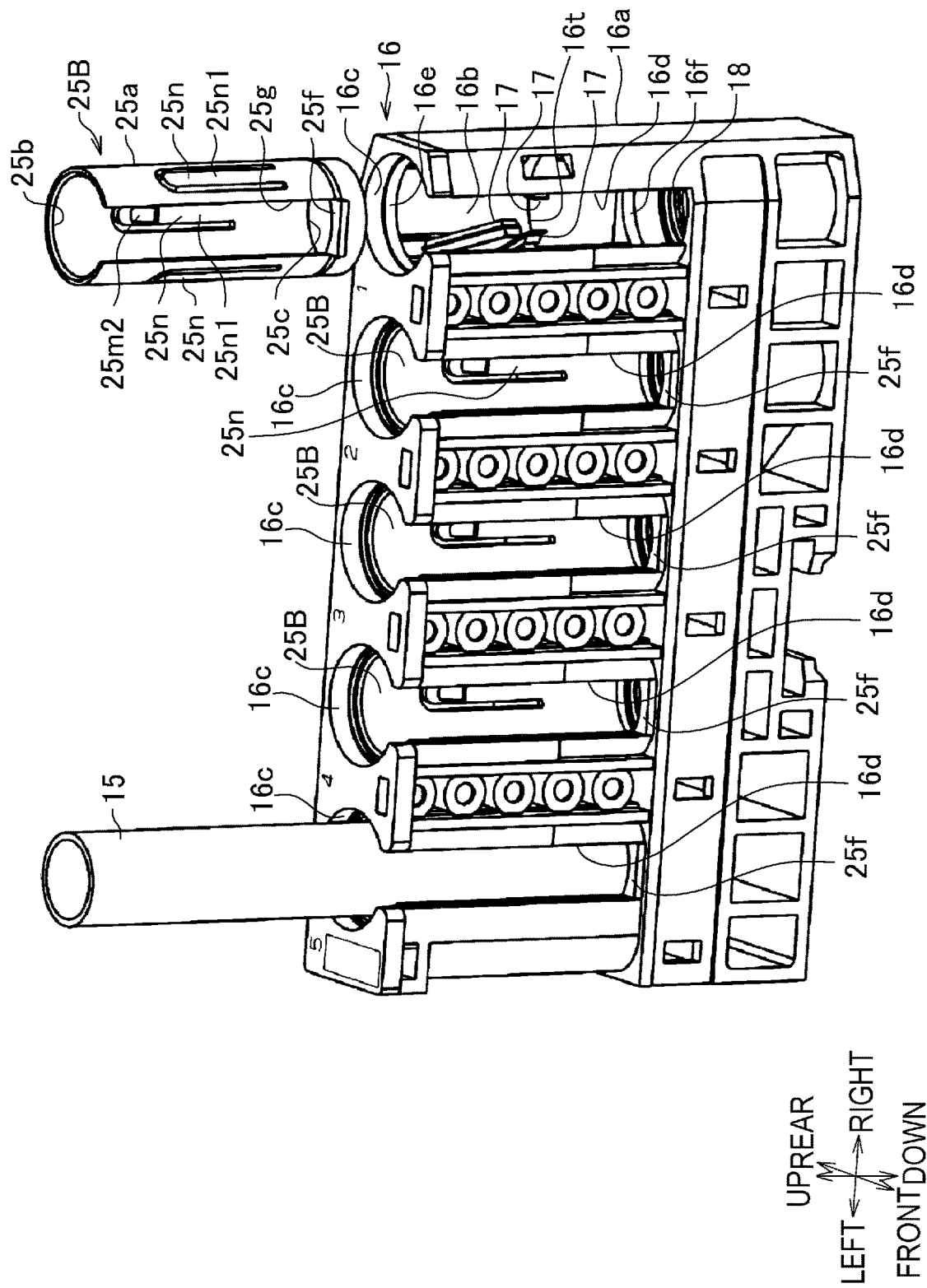
FIG. 8 is a perspective view illustrating a specimen rack where an adapter according to a second embodiment is provided.

FIG. 8 is a perspective view illustrating a specimen rack where an adapter according to a second embodiment is provided. In FIG. 8, an adapter (adapter for specimen rack) 25B is mounted on the specimen rack 16 similar to that of the first embodiment.

As shown in FIG. 8, the adapter 25B according to the second embodiment includes a cylinder 25a having a cylindrical shape. The cylinder 25a is made of an elastically deformable material such as resin. Note that, unlike the first embodiment, the second embodiment has a structure that does not use the plate springs 17 originally provided in the specimen rack 16 (the same applies to the third and subsequent embodiments).

The cylinder 25a includes plate spring portions 25n, 25n, and 25n (elastic support portions) that press and support the test tube 15. The plate spring portions 25n are arranged at equal intervals in the circumferential direction.

The plate spring portion 25n includes an upward plate portion 25n1 extending in the axial direction (vertical direction) and including a free end on an upper side, and a protrusion portion 25n2 formed to protrude to an inner surface of the upward plate portion 25n1 on the free end side.

Figure 9:
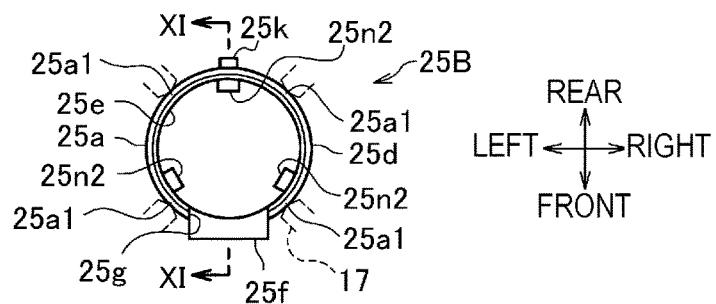
FIG. 9 is a top view illustrating the adapter according to the second embodiment.

FIG. 9 is a top view illustrating the adapter according to the second embodiment.

As shown in FIG. 9, the cylinder 25a has an outer circumferential surface 25d having an outer diameter substantially the same as the inner diameter of the insertion hole 16c of the specimen rack 16 (see FIG. 2). The cylinder 25a has an inner circumferential surface 25e having an inner diameter that is substantially the same as an outer diameter of the test tube 15 or slightly larger than the outer diameter of the test tube 15. As a result, when the test tube 15 is inserted into the specimen rack 16, the gap in which the test tube 15 having a small outer diameter is tilted can be eliminated as much as possible.

The cylinder 25a includes wall portions 25a1, 25a1, 25a1, 25a1 formed at positions facing the plate springs 17, 17, 17, and 17 of the specimen rack 16 (see FIGS. 6 and 8). In FIG. 9, the positions of the plate springs 17 are shown by a broken line. As a result, the plate spring 17 abuts the wall portion 25a1 such that the plate spring 17 does not protrude from the inner circumferential surface 25e of the cylinder 25a. That is, in the second embodiment, the function of the plate spring 17 of the specimen rack 16 is disabled by the wall portion 25a1 of the cylinder 25a.

The protrusion portion 25n2 protrudes inward in the radial direction from the inner circumferential surface 25e of the cylinder 25a. The protrusion portions 25n2 (plate spring portions 25n) are arranged at intervals of 120 degrees in the circumferential direction.

Figure 10:
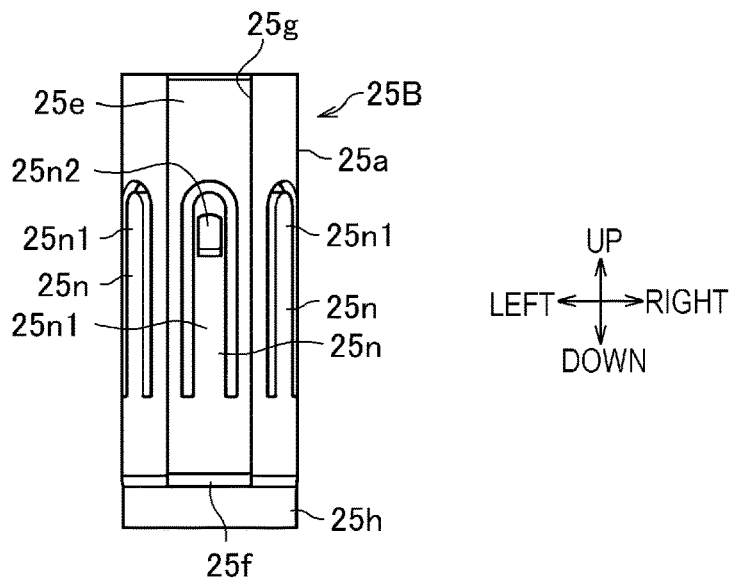
FIG. 10 is a front view illustrating the adapter according to the second embodiment.

FIG. 10 is a front view illustrating the adapter according to the second embodiment.

As shown in FIG. 10, the upward plate portion 25n1 is formed by notching the circumferential wall of the cylinder 25a in an inverted U shape. The upward plate portion 25n1 is located substantially at the center of the cylinder 25a in the axial direction (vertical direction). The base end of the upward plate portion 25n1 is located below the center in the axial direction (vertical direction).

One of the plate spring portions 25n is formed on the back surface side of the cylinder 25a facing the slit 25g. The other two plate spring portions 25n are formed on both the left and right sides to interpose the slit 25g therebetween. The plate springs 25n have all the same shape and are located at the same height.

The protrusion portion 25n2 is formed on the free end side (upper end side) of the plate spring portion 25n. The protrusion portion 25n2 is located above the center in the axial direction (vertical direction).

Figure 11:
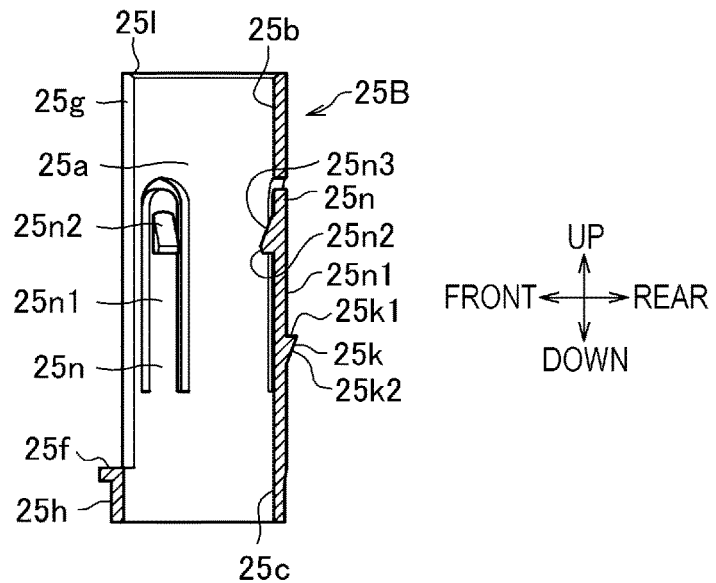
FIG. 11 is a cross-sectional view taken along line XI-XI of FIG. 9.

FIG. 11 is a cross-sectional view taken along line XI-XI of FIG. 9.

As shown in FIG. 11, the protrusion portion 25n2 has a substantially triangular shape in a cross-sectional view, and includes an inclined surface 25n3 extending downward from the upper end toward the front. As described above, by forming the inclined surface 25n3 on the protrusion portion 25n2, the test tube 15 is prevented from being caught by the protrusion portion 25n2 when the test tube 15 is inserted into the specimen rack 16.

A retaining protrusion 25k is formed on the outer surface of an upward plate portion 25 located on a back surface of the cylinder 25a. The retaining protrusion 25k includes a horizontal surface portion 25k1 extending toward the rear side in the horizontal direction at the upper end, and an inclined surface portion 25k2 extending from the leading end of the horizontal surface portion 25k1 toward the upward plate portion 25n1.

As described above, by providing the retaining protrusion 25k in the upward plate portion 25n1, when the adapter 25B is inserted through the insertion hole 16c of the specimen rack 16 (see FIG. 8), the inclined surface portion 25k2 abuts the inner wall surface of the insertion hole 16c of the specimen rack 16, and the upward plate portion 25n1 is bent inward in the radial direction. Then, if the adapter 25B is further inserted, when the retaining protrusion 25k is located at the opening 16t formed in the specimen rack main body 16a, the upward plate portion 25n1 is elastically returned. As a result, the edge portion of the opening 16t and the horizontal surface portion 25k1 face each other, so that the adapter 25B can be prevented from separating from the specimen rack 16. The adapter 25B is prevented from being unexpectedly separated. Since the retaining protrusion 25k is located at the base end of the upward plate portion 25n1 (closer to the base end than the protrusion portion 25n2), the retaining protrusion 25k is hardly separated from the opening 16t, and the adapter 25B is hardly separated from the specimen rack 16.

As described above, when the test tube 15 is inserted through the insertion hole 16c in the state where the adapter 25B is mounted on the specimen rack 16, the outer circumferential surface of the test tube 15 comes into contact with the protrusion portion 25n2. Then, when the protrusion portion 25n2 is pressed by the test tube 15, the upward plate portion 25n1 is elastically deformed outward in the radial direction. Although not shown, a gap is formed between the upward plate portion 25n1 and the accommodation portion 16b of the specimen rack 16 to allow the upward plate portion 25n1 to bend and deform. Then, when the lower end (leading end) of the test tube 15 abuts the retaining portion 18, mounting the test tube 15 on the specimen rack 16 is completed.

Figure 12:
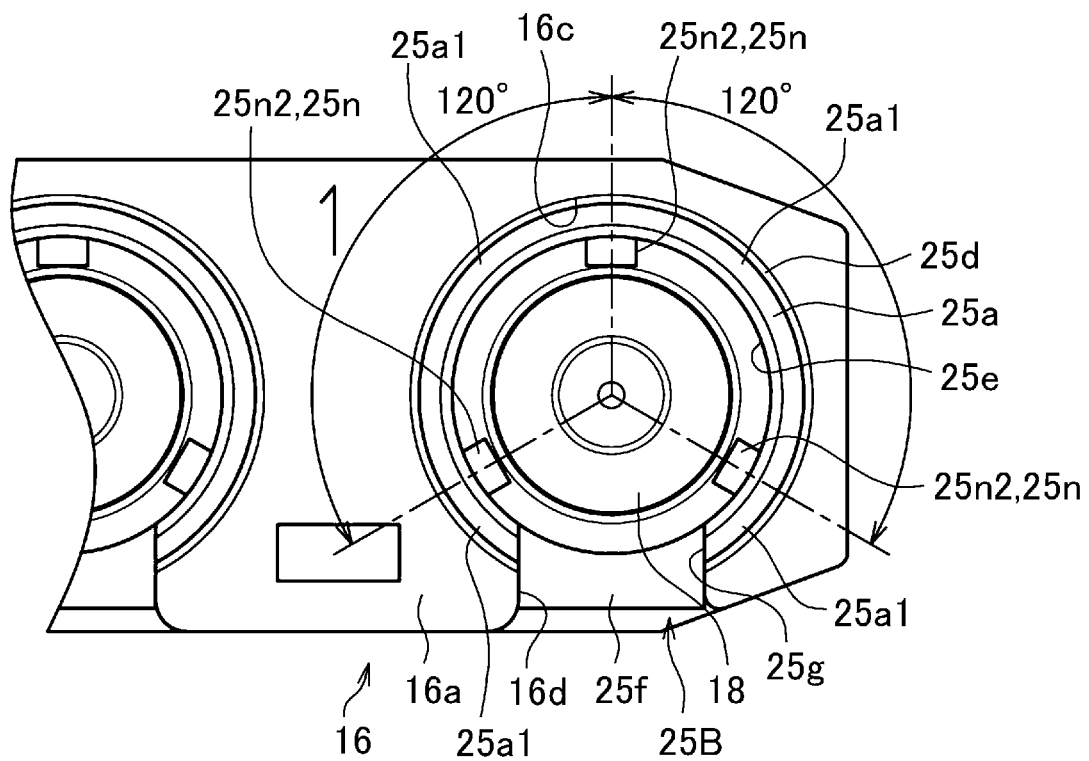
FIG. 12 is a top view illustrating a state where the adapter according to the second embodiment is attached to the specimen rack.

FIG. 12 is a top view illustrating the adapter according to the second embodiment attached to the specimen rack. Note that FIG. 12 illustrates a state where the test tube 15 is not mounted.

As shown in FIG. 12, the adapter 25B is held in the accommodation portion 16b (see FIG. 8) of the specimen rack 16. Although not shown, the adapter 25B is held in surface contact with the upper circumferential surface portion 16e (see FIG. 8), the inner circumferential wall surface of the accommodation portion 16b, and the inner circumferential wall surface of the lower circumferential surface portion 16f (see FIG. 8). Although not shown, a gap is formed on the inner circumferential wall surface of the accommodation portion 16b to allow elastic deformation of the plate spring portion 25n.

Here, the protrusion portions 25n2, 25n2, and 25n2 provided on the adapter 25B protrude to the inside (inner diameter side) of the cylinder 25a. As described above, by providing the protrusion portions 25n2, the protrusion portions 25n2 are pushed away when the test tube 15 is inserted, and the test tube 15 is held by the generated reaction force.

The adapter 25B can hold the test tube 15 up to a size (outer diameter) that can come into contact with the protrusion portions 25n2 of the plate spring portions 25n and receive the reaction force of the plate spring portions 25n.

The plate springs 17 (see FIG. 8) provided on the specimen rack 16 are in contact with the wall portions 25a1 of the cylinder 25a. The adapter 25B is made of resin having such a strength that the shape is not deformed by the reaction force of the plate spring 17 (see FIG. 8) of the specimen rack 16.

When the adapter 25B is mounted on the specimen rack 16, the adapter 25B is pushed through the insertion hole 16c with the rotation preventing plate 25f of the adapter 25B fitted to the side opening 16d of the specimen rack 16. As a result, the adapter 25B is slid downward while the rotation preventing plate 25f is slid on both ends of the side opening 16d. Here, each plate spring 17 is pressed by the wall portion 25a1 on the outer circumferential surface 25d of the cylinder 25a such that the plate spring 17 is bent and deformed outward in the radial direction.

The plate spring portions 25n of the adapter 25B are configured to open upward when the test tube 15 is inserted into the specimen rack 16. Because when the plate spring portions are opened downward, the position where the protrusion portions of the plate spring portions contact the test tube 15 are lowered. The center of the bottom of the test tube 15 comes into contact with the retaining portion 18 to determine the position. Therefore, in order to hold the test tube 15 in a more vertical state, the protrusion portions 25n2 preferably come into contact with the test tube 15 at a high position.

As shown in FIG. 12, in the adapter 25B, the protrusions 25n2 of the plate spring portions 25n adjacent to each other in the circumferential direction are installed at equal intervals of 120°. As a result, the reaction forces of the plate spring portions 25n cancel each other out, so that the test tube 15 can be held at the center of the cylindrical shape and the test tube 15 can be held vertically. In the adapter 25B, since the test tube 15 is held by the reaction force of the plate spring portions 25n, the test tube 15 can be held as long as an outer diameter of the test tube 15 can push the protrusion portions 25n2 of the plate spring portions 25n.

As described above, in the second embodiment, the specimen rack main body 16a into which the standard test tube is inserted through the insertion hole 16c, the plurality of plate springs 17, 17, 17, and 17 provided in the specimen rack main body 16a to press and hold a standard test tube, and the adapter 25B inserted through the insertion hole 16c are provided. The adapter 25B includes the cylinder 25a that is inserted through the insertion hole 16c. The cylinder 25a includes wall portions 25a1, 25a1, 25a1, and 25a1 arranged at positions facing the plate springs 17, and includes the plate spring portions 25n, 25n, and 25n that press and support the test tube 15 having the outer diameter smaller than that of the insertion hole 16c (see FIGS. 8 to 11). Accordingly, by making the gap between the inner circumferential surface 25e of the adapter 25B (cylinder 25a) and the outer circumferential surface of the test tube 15 as small as possible, the room where the test tube 15 can be tilted can be reduced. By holding the test tube 15 with the plate spring portion 25n provided on the adapter 25B, the test tube 15 can be held in a substantially vertical state. As a result, when the small cup 60 (see FIG. 7) is placed on the test tube 15 by the cup-on method for analysis, the axial center of the sample probe 3a (see FIG. 1) can be aligned with the axial center of the small cup 60 (see the alternate long and short dash line in FIG. 7). As a result, the liquid level in the small cup 60 can be accurately detected, and a predetermined amount required for analysis can be sucked into the sample probe 3a.

The second embodiment is formed of the plurality of plate spring portions 25n arranged at equal intervals in the circumferential direction (see FIG. 12). Accordingly, by providing the plate spring portions 25n at equal intervals, the reaction forces of the plate spring portions 25n cancel each other out, so that the test tube 15 can be held at the center of the cylindrical shape and the test tube 15 can be held vertically.

According to the second embodiment, the plate spring portion 25n includes the upward plate portion 25n1 extending in the axial direction (vertical direction) and having the free end on an upper side, and the protrusion portion 25n2 formed to protrude on an inner surface of the upward plate portion 25n1 on the free end side. Accordingly, the test tube 15 can be held without forming the notch portions 25i and 25m at the positions of the plate springs 17 of the specimen rack 16 as in the first embodiment.

According to the second embodiment, on the outer circumferential surface 25d of the cylinder 25a, the retaining protrusion 25k is formed, which engages the cylinder 25a with the specimen rack main body 16a to prevent the cylinder 25a from separating from the specimen rack main body 16a. Accordingly, the adapter 25B is prevented from being unexpectedly separated from the specimen rack 16.

According to the second embodiment, the retaining protrusion 25k is formed on the outer surface of the upward plate portion 25n1. Accordingly, forming a dedicated plate spring for forming the retaining protrusion 25k is not essential, and the shape of the adapter 25B is prevented from becoming complicated.

According to the second embodiment, the cylinder 25a includes the slit 25g formed along the side opening 16d of the specimen rack main body 16a, and a rotation preventing plate 25f that protrudes toward the side opening 16d and fits with the side opening 16d. Accordingly, since the slit 25g does not rotate with respect to the side opening 16d when the specimen rack 16 is transported, the reading of the barcode attached to the test tube 15 is prevented from being hindered.

Third Embodiment

Figure 13:
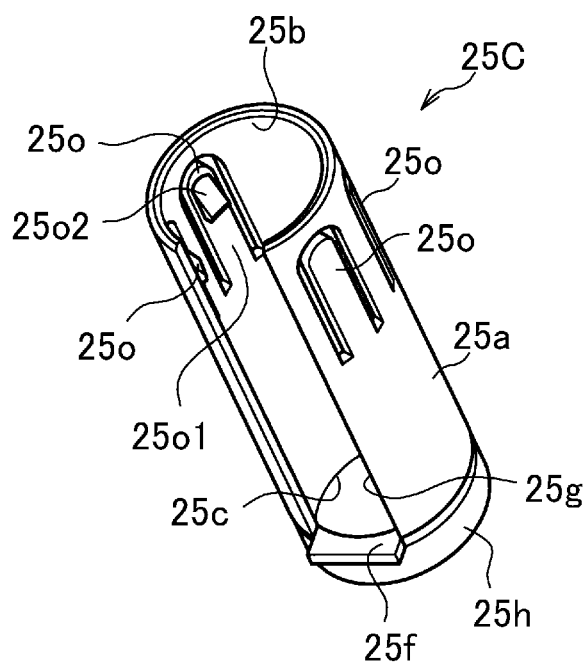
FIG. 13 is a perspective view illustrating an adapter according to a third embodiment.

FIG. 13 is a perspective view illustrating an adapter according to a third embodiment. The same reference numerals are given to same constituent elements as those in the second embodiment, and the description thereof will not be repeated (the same applies to the fourth and subsequent embodiments).

As shown in FIG. 13, an adapter 25C of the third embodiment includes a cylinder 25a. The cylinder 25a includes plate spring portions 25o, 25o, 25o, and 25o (elastic support portions) that press and support a test tube 15. The plate spring portions 25o are arranged at intervals in the circumferential direction.

The plate spring portion 25o includes an upward plate portion 25o1 extending in the axial direction (vertical direction) and having a free end on an upper side, and a protrusion portion 25o2 formed to protrude to an inner surface of the upward plate portion 25o1 on the free end side.

Figure 14:
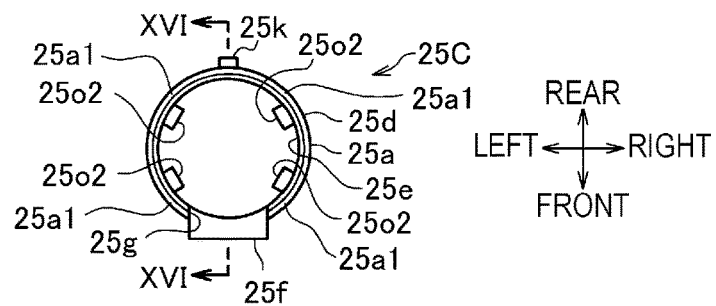
FIG. 14 is a top view illustrating the adapter according to the third embodiment.

FIG. 14 is a top view illustrating the adapter according to the third embodiment.

As shown in FIG. 14, the cylinder 25a has an inner circumferential surface 25e having an inner diameter that is substantially the same as an outer diameter of the test tube 15 or slightly larger than the outer diameter of the test tube 15. As a result, the gap where the test tube 15 having a small outer diameter is tilted can be eliminated as much as possible.

In the cylinder 25a, protrusion portions 25o2 formed on the upward plate portion 25o1 protrude inward (inner diameter side) from the inner circumferential surface 25e of the cylinder 25a. The protrusion portion 25o2 on the right back side in the drawing and the protrusion portion 25o2 on the front left side in the drawing are formed at positions facing each other to interpose the center of the cylinder 25a therebetween. The protrusion portion 25o2 on the right front side in the drawing and the protrusion portion 25o2 on the back left side in the drawing are formed at positions facing each other to interpose the center of the cylinder 25a therebetween.

Figure 15:
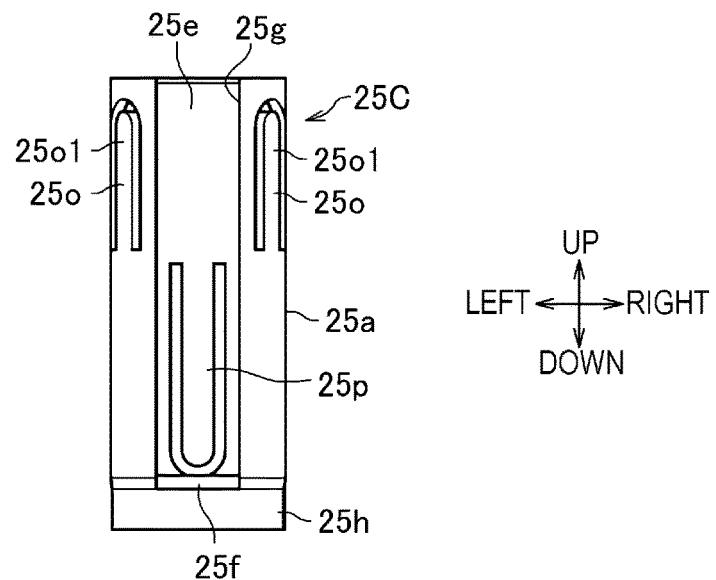
FIG. 15 is a front view illustrating the adapter according to the third embodiment.

FIG. 15 is a front view illustrating the adapter according to the third embodiment.

As shown in FIG. 15, the upward plate portion 25o1 of the plate spring portion 25o is formed by notching the circumferential wall of the cylinder 25a in an inverted U shape. The upward plate portion 25o1 is located above the substantially center of the cylinder 25a in the axial direction (vertical direction). The free end (leading end) of the upward plate portion 25o1 is located above the cylinder 25a.

The plate spring portions 25o are formed separately on the left and right sides to interpose the slit 25g therebetween. The plate spring portions 25o have all the same axial length and are formed to have the same height position.

The cylinder 25a includes a downward plate portion 25p extending in the axial direction and having a free end on the lower side, on the back surface facing the slit 25g. The downward plate portion 25p is formed by notching the circumferential wall of the cylinder 25a in a U shape. The downward plate portion 25p is located below the upward plate portion 25o1 described above. The downward plate portion 25p is formed longer than the upward plate portion 25o1 in the axial direction (vertical direction). The free end (lower end) of the downward plate portion 25p extends to a position where the free end overlaps with the rotation preventing plate 25f in the front view.

Figure 16:
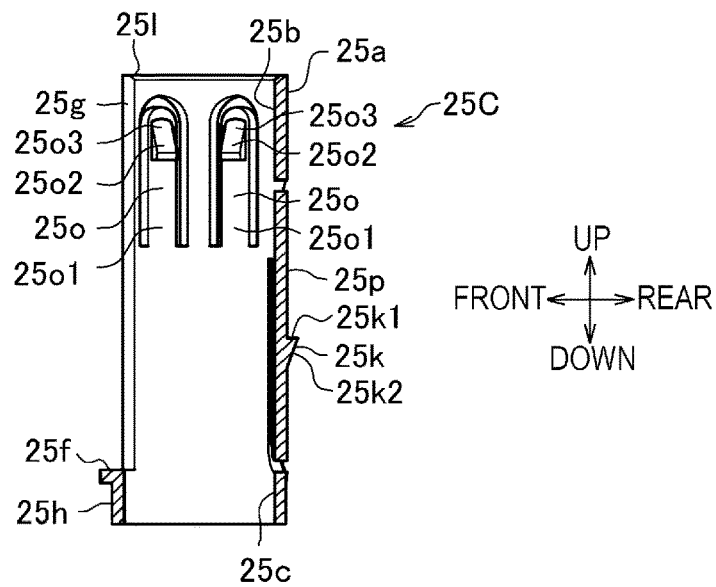
FIG. 16 is a cross-sectional view taken along line XVI-XVI of FIG. 14.

FIG. 16 is a cross-sectional view taken along line XVI-XVI of FIG. 14.

As shown in FIG. 16, the protrusion portion 25o2 has a substantially triangular shape like the protrusion portion 25n2 of the second embodiment, and has an inclined surface 25o3 descending inward in the radial direction from the upper end. As described above, by forming the inclined surface 25o3 on the protrusion portion 25o2, the test tube 15 is prevented from being caught by the protrusion portion 25o2 when the test tube 15 is inserted into the specimen rack 16 to which the adapter 25C is mounted.

As described above, by providing the adapter 25C in the specimen rack 16, when the test tube 15 is inserted into the specimen rack 16, the reaction forces generated in each plate spring portion 25o can cancel each other out, and the test tube 15 can be held vertically. Each plate spring portion 25o is installed at a higher position away from the retaining portion 18 as compared with the adapter 25B of the second embodiment. As described above, by holding the test tube 15 at a high position by the adapter 25C, the test tube 15 is centered more easily.

As described above, in the third embodiment, the cylinder 25a includes the downward plate portion 25p which extends in the axial direction (vertical direction) and has the free end on the lower side. On the outer surface of the downward plate portion 25p, the retaining protrusion 25k is formed to prevent the cylinder 25a from separating from the specimen rack main body 16a (see FIG. 8). Accordingly, since the downward plate portion 25p operates independently of the plate spring portions 25o, the retaining protrusion 25k is prevented from being separated from the specimen rack 16 due to the operation of the plate spring portions 25o.

According to the third embodiment, the upward plate portion 25o1 is located above the downward plate portion 25p. Accordingly, by holding the test tube 15 on the upper side by the adapter 25C, the test tube 15 is prevented from being tilted and the test tube 15 can be easily held in the center.

Fourth Embodiment

Figure 17:
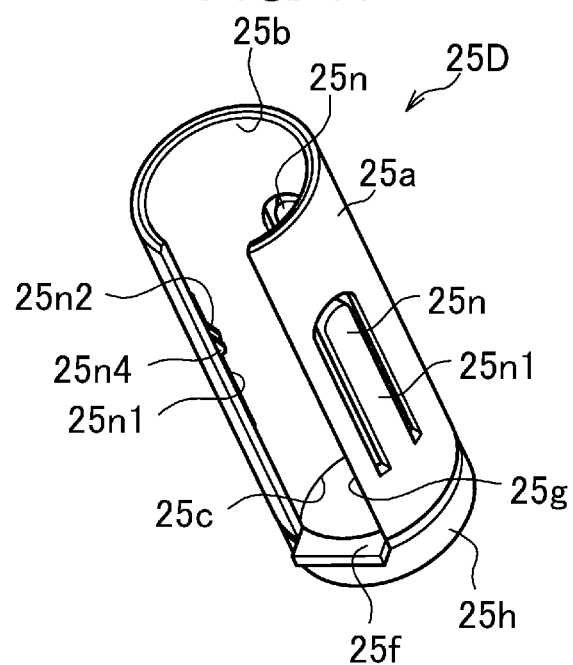
FIG. 17 is a perspective view illustrating an adapter according to a fourth embodiment.

FIG. 17 is a perspective view illustrating an adapter according to a fourth embodiment.

As shown in FIG. 17, an adapter 25D of the fourth embodiment includes a groove 25n4 formed in the adapter 25B of the second embodiment. The groove 25n4 is formed in the protrusion portion 25n2 formed in the plate spring portion 25n. In FIG. 17, although only one groove 25n4 is shown, the groove 25n4 is also similarly formed in the protrusion portions 25n2 of the other plate spring portions 25n.

Figure 18:
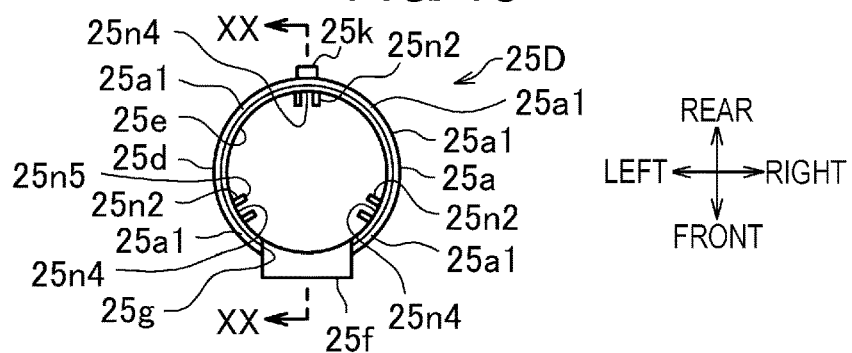
FIG. 18 is a top view illustrating the adapter according to the fourth embodiment.

FIG. 18 is a top view illustrating the adapter according to the fourth embodiment.

As shown in FIG. 18, the protrusion portion 25n2 is formed to protrude inward in the radial direction from the inner circumferential surface 25e of the cylinder 25a. The protrusion portions 25n2 (plate spring portions 25n) are arranged at intervals of 120 degrees in the circumferential direction.

The grooves 25n4 extending in the vertical direction (vertical direction to the paper surface) are respectively formed in the protrusion portions 25n2. As a result, the protrusion portion 25n2 is formed by being divided into protrusions 25n5, 25n5 in the circumferential direction, and is formed in a concave shape inward in the radial direction by the protrusion portion 25n2 and the inner circumferential surface 25e in a top view (plan view).

Figure 19:
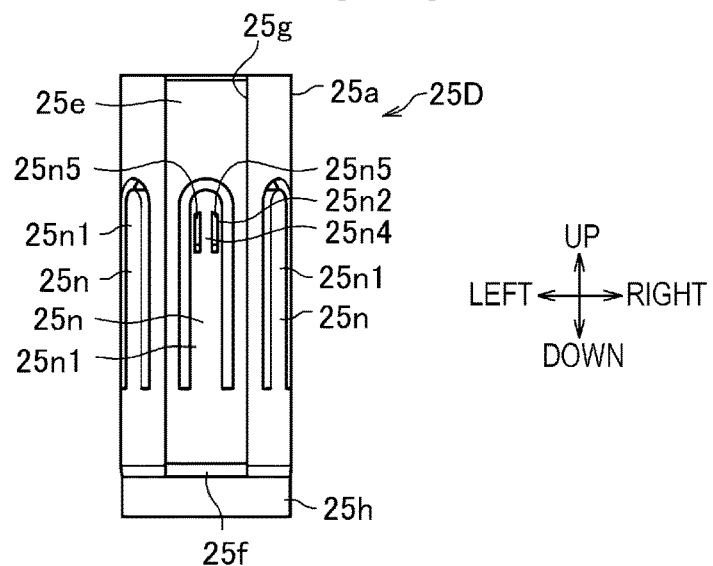
FIG. 19 is a front view illustrating the adapter according to the fourth embodiment.

FIG. 19 is a front view illustrating the adapter according to the fourth embodiment.

As shown in FIG. 19, the groove 25n4 is formed by notching the protrusion portion 25n2 from upper to lower ends with a predetermined width. The predetermined width is appropriately set within a range in which the strength of the protrusion portion 25n2 can be ensured.

Figure 20:
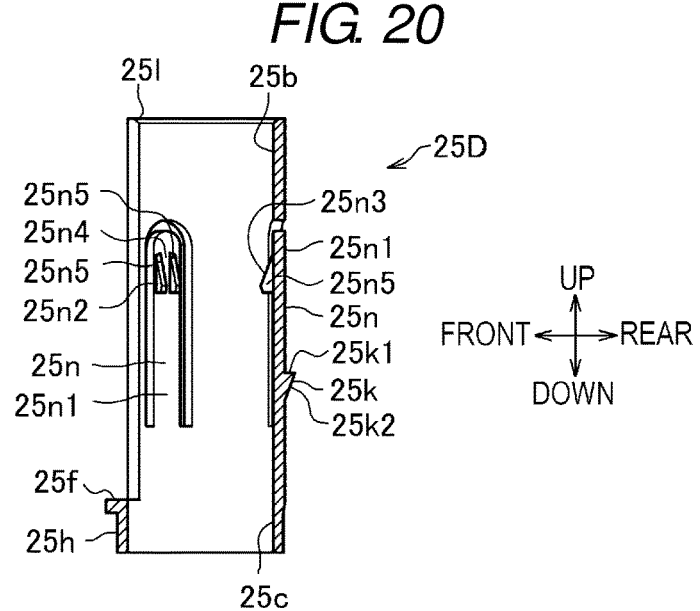
FIG. 20 is a cross-sectional view taken along line XX-XX of FIG. 18.

FIG. 20 is a cross-sectional view taken along line XX-XX of FIG. 18.

As shown in FIG. 20, one of the bisected protrusions 25n5 has a substantially triangular shape in the lateral view in the circumferential direction, and includes an inclined surface 25n3 extending inward in the radial direction from the upper end downward. By providing the protrusion 25n5 having such a shape, the test tube 15 is prevented from being caught by the protrusion 25n5 when the test tube 15 is inserted into the specimen rack 16 to which the adapter 25C is mounted.

The shape of the groove 25n4 is formed in a quadrangular shape in the top view in FIG. 18, but may be formed in other shapes such as a semicircle or a triangle (V shape) in the top view. Although the protrusion portion 25n2 is configured to be divided into two in the circumferential direction, the protrusion portion 25n2 may be configured to be divided into three or more in the circumferential direction. The protrusion portion 25n2 may be configured to be divided into two or three or more in the axial direction (vertical direction).

Figure 21:
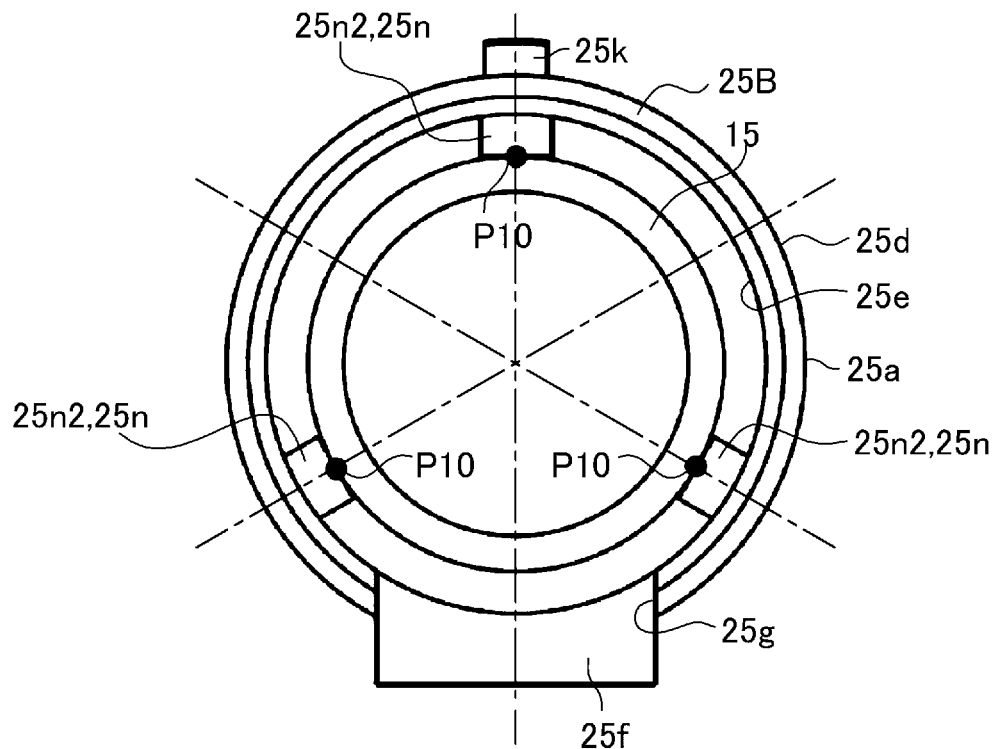
FIG. 21 is a top view illustrating a state where a test tube is mounted on an adapter having no groove.
Figure 22:
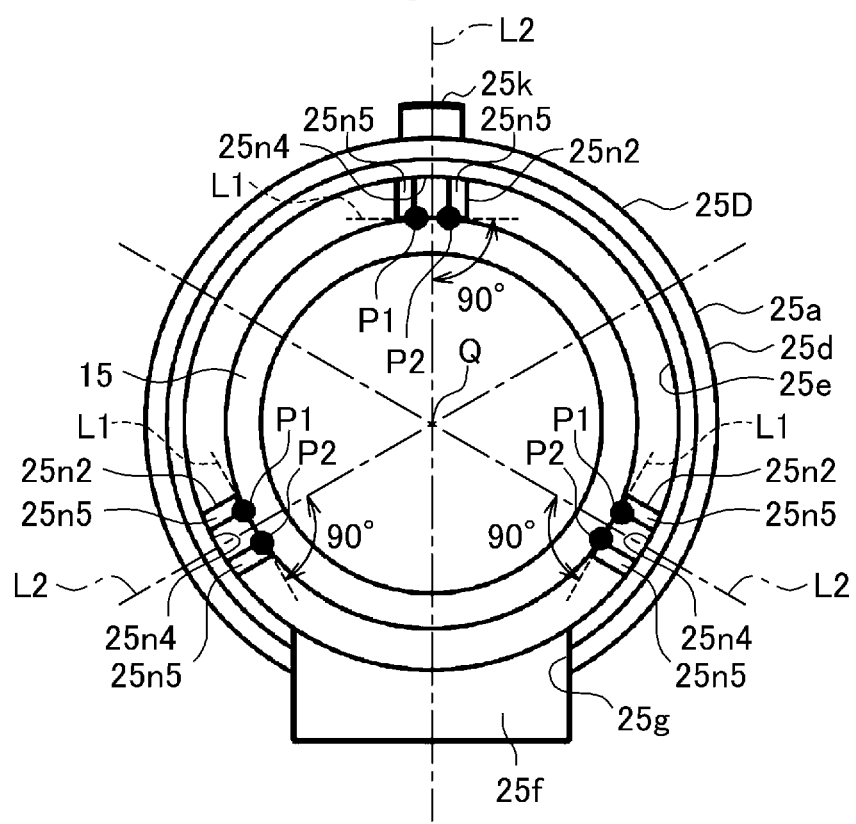
FIG. 22 is a top view illustrating a state where a test tube is mounted on the adapter according to the fourth embodiment.

FIG. 21 is a top view illustrating a state where the test tube is mounted on an adapter having no groove. FIG. 22 is a top view illustrating a state where the test tube is mounted on the adapter according to the fourth embodiment. Note that FIGS. 21 and 22 show a state where a large gap is formed between the adapters 25B and 25D and the test tube 15 for convenience of explanation.

As shown in FIG. 21, when the groove 25n4 is not formed in the protrusion portion 25n2 (in the case of the adapter 25B of the second embodiment), the test tube 15 having a circular cross-sectional shape (circular cross-sectional shape) and the adapter 25B are in contact with each other at one point at the protrusion portion 25n2 of each plate spring portion 25n as shown by a point P10. Here, when the reaction force of each plate spring portion 25n is balanced, the test tube 15 is held at the center. However, when the reaction force is strong or weak at only one location due to, for example, variations in the sheet thickness of the plate spring portion 25n in manufacturing, the test tube 15 may deviate with respect to the protrusion portion 25n2 of the plate spring portion 25n in the tangential direction, resulting in the test tube 15 deviating from the center.

Meanwhile, as shown in FIG. 22, when the groove 25n4 is formed in the protrusion portion 25n2, the number of contact points with the test tube 15 increases as compared with the case of FIG. 21 as shown by points P1 and P2. Here, the test tube 15 is held down by the same reaction force of the plate spring portion 25n at the two contact points (P1 and P2) of each protrusion portion 25n2 (protrusions 25n5, 25n5), so that the test tube 15 can be stably held. Here, since the points P1 and P2 are caught by and serve as resistance to the deviation of the test tube 15 in the tangential direction, the test tube 15 is more easily held in the center. With respect to a line L1 that connects the two contact points of the protrusions 25n5, 25n5 of each plate spring portion 25n, by installing the groove 25n4 such that a point Q, where the normal lines L2 each passing through the midpoint between the two points intersect with each other, is the center, holding in the center is further facilitated.

As described above, according to the fourth embodiment, the protrusion portion 25n2 is formed with the groove 25n4 having a concave shape inward in the radial direction. By forming the groove 25n4 in the protrusion portion 25n2 and dividing the protrusion portion 25n2 into the protrusions 25n5 and 25n5, the test tube 15 is prevented from being deviated in the tangential direction, and the test tube 15 is easily held in the center.

Fifth Embodiment

Figure 23:
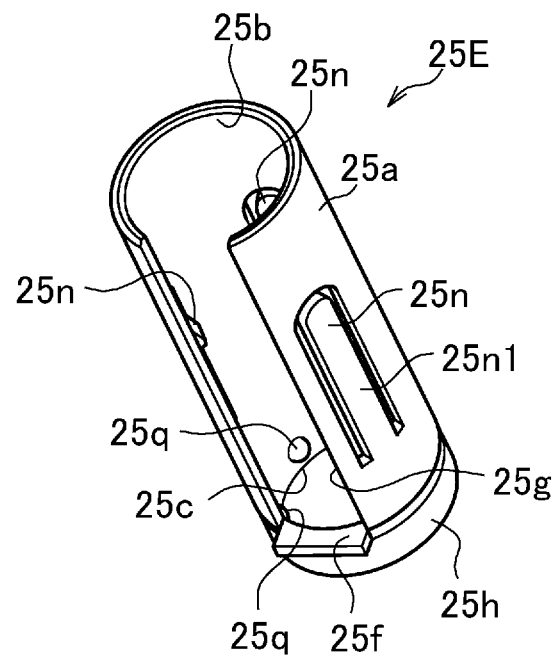
FIG. 23 is a perspective view illustrating an adapter according to a fifth embodiment.

FIG. 23 is a perspective view illustrating an adapter according to a fifth embodiment.

As shown in FIG. 23, an adapter 25E according to the fifth embodiment is configured by adding an abutting portion 25q to the adapter 25B according to the second embodiment. The abutting portion 25q is located at a lower part of the cylinder 25a.

Figure 24:
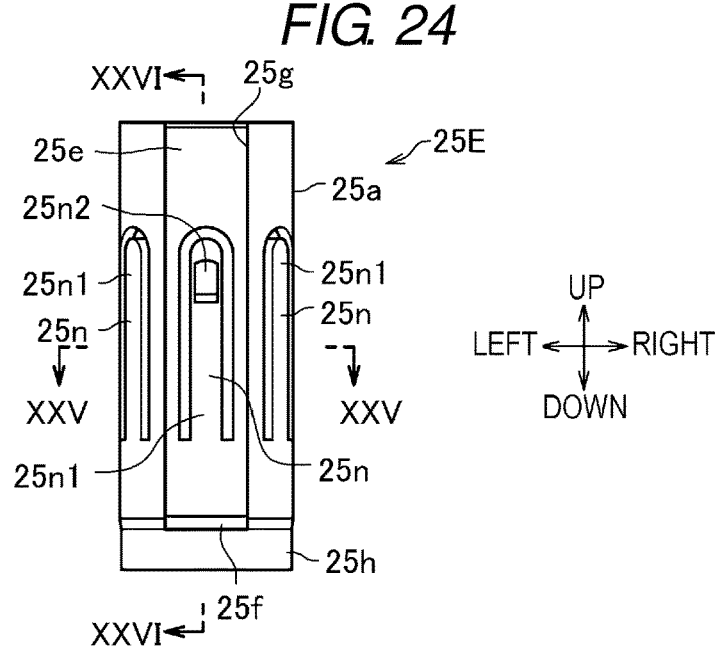
FIG. 24 is a front view illustrating the adapter according to the fifth embodiment.

FIG. 24 is a front view illustrating the adapter according to the fifth embodiment.

As shown in FIG. 24, the adapter 25E includes the cylinder 25a having a cylindrical shape. The cylinder 25a is made of an elastically deformable material such as resin. The cylinder 25a includes plate spring portions 25n, 25n, and 25n that press and support the test tube 15. The plate spring portions 25n are arranged at equal intervals in the circumferential direction.

Figure 25:
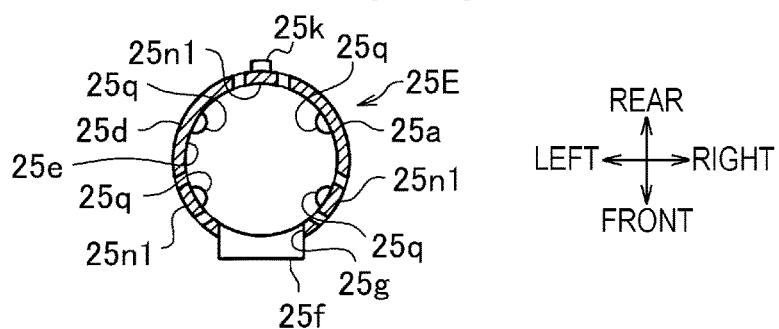
FIG. 25 is a cross-sectional view taken along line XXV-XXV of FIG. 24.

FIG. 25 is a cross-sectional view taken along line XXV-XXV of FIG. 24.

As shown in FIG. 25, the abutting portion 25q is formed in a hemispherical shape, and is formed to protrude inward in the radial direction from the inner circumferential surface 25e of the cylinder 25a. The abutting portions 25q are formed at four positions. The abutting portion 25q is formed separately on the left and right sides to interpose the center of the cylinder 25a therebetween. The abutting portion 25q on the right back side and the abutting portion 25q on the left front side are formed to face each other to interpose the center of the cylinder 25a therebetween. The abutting portion 25q on the right front side and the abutting portion 25q on the left back side are formed to face each other to interpose the center of the cylinder 25a therebetween.

The abutting portions 25q on the left and right front sides are located on an extension line in the axial direction of the upward plate portion 25n1. The abutting portions 25q on the left and right back sides are located in the middle of the upward plate portions 25n1 adjacent to each other in the circumferential direction in the cross-sectional view (plan view).

Figure 26:
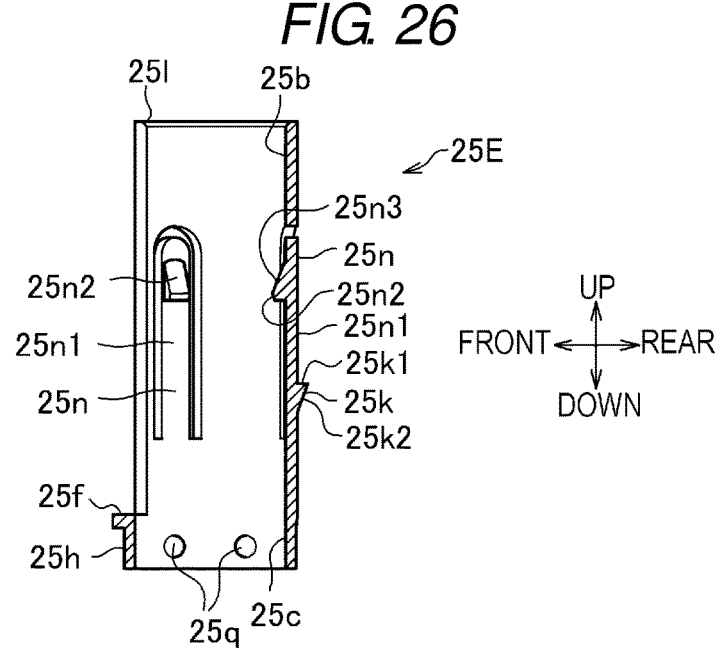
FIG. 26 is a cross-sectional view taken along line XXVI-XXVI of FIG. 24.

FIG. 26 is a cross-sectional view taken along line XXVI-XXVI of FIG. 24.

As shown in FIG. 26, the abutting portion 25q is formed on the inner wall surface of the annular portion 25h of the cylinder 25a. Note that the effect is considered to be exhibitable if the number of the abutting portions 25q is 3 or more. According to the fifth embodiment, although the shape of the abutting portion 25q is hemispherical, the effect can be exhibited by other shapes such as a rectangular parallelepiped or the like.

Meanwhile, since the test tube 15 is manufactured in a mold for mass production, the test tube 15 is formed with a taper, and the bottom of the test tube 15 is slightly thinner. Therefore, in the adapter 25E according to the fifth embodiment, by supporting the narrowed portion of the test tube 15 with the hemispherical abutting portion 25q provided at the lower part, the stability of holding the test tube 15 can be increased.

As described above, according to the fifth embodiment, the plurality of abutting portions 25q that abut the test tube 15 are formed on the inner circumferential surface 25e of the cylinder 25a at intervals in the circumferential direction. Accordingly, when the test tube 15 including a taper of which outer diameter decreases toward the bottom is used, the tapered portion of the test tube 15 is abutted, and the test tube 15 can be stably held.

Sixth Embodiment

Figure 27:
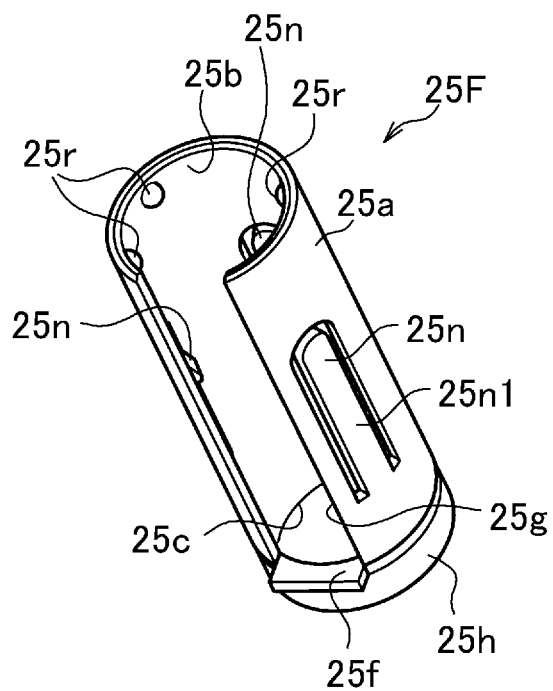
FIG. 27 is a perspective view illustrating an adapter according to a sixth embodiment.

FIG. 27 is a perspective view illustrating an adapter according to a sixth embodiment.

As shown in FIG. 27, an adapter 25F according to the sixth embodiment is configured by adding an abutting portion 25r to the adapter 25B of the second embodiment. The abutting portion 25r is located above the cylinder 25a.

Figure 28:
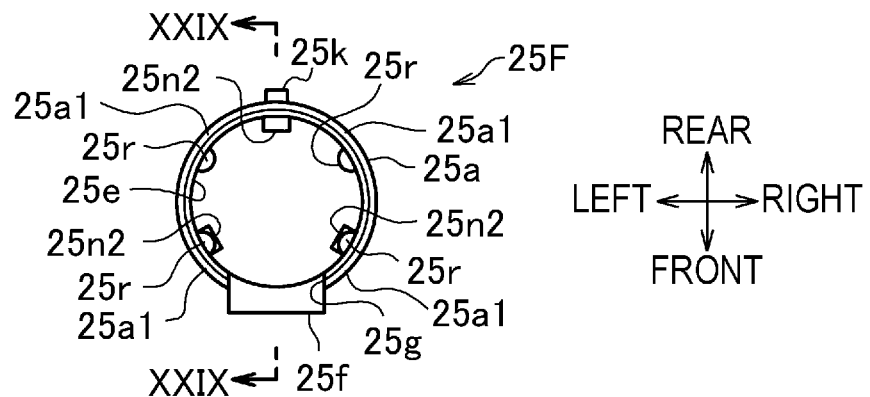
FIG. 28 is a top view illustrating the adapter according to the sixth embodiment.

FIG. 28 is a top view illustrating the adapter according to the sixth embodiment.

As shown in FIG. 28, the abutting portion 25r is formed in a hemispherical shape, and is formed to protrude inward in the radial direction from the inner circumferential surface 25e of the cylinder 25a. The abutting portions 25r are formed at four positions. The abutting portions 25r are formed separately on the left and right sides to interpose the center of the cylinder 25a therebetween. The abutting portion 25r on the right back side and the abutting portion 25r on the left front side are formed to face each other to interpose the center of the cylinder 25a therebetween. The abutting portion 25r on the right front side and the abutting portion 25r on the left back side are formed to face each other to interpose the center of the cylinder 25a therebetween.

The abutting portions 25r on the left and right front sides are located on an extension line in the axial direction of the upward plate portion 25n1. The abutting portions 25r on the left and right back sides are located in the middle of the upward plate portions 25n1 (see FIG. 27) adjacent to each other in the circumferential direction in the cross-sectional view (plan view).

Figure 29:
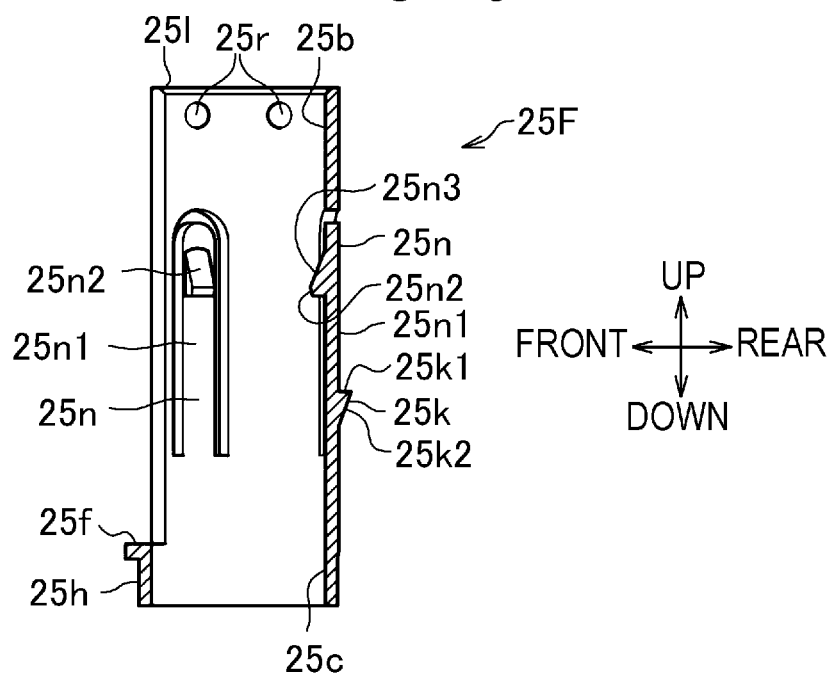
FIG. 29 is a cross-sectional view taken along line XXIX-XXIX of FIG. 28.

FIG. 29 is a cross-sectional view taken along line XXIX-XXIX of FIG. 28.

As shown in FIG. 29, the abutting portion 25r is formed on the inner circumferential surface 25e at the upper end of the cylinder 25a. Note that the effect is considered to be exhibitable if the number of the abutting portions 25r is 3 or more. According to the sixth embodiment, although the shape of the abutting portion 25r is hemispherical, the effect can be exhibited by other shapes such as a rectangular parallelepiped or the like.

Meanwhile, when a thin test tube 15 is used, a slight gap is generated between the test tube 15 and the inner circumferential surface 25e of the adapter 25F for fixing with the plate spring portion 25n. Therefore, by forming the abutting portion 25r on the upper part of the adapter 25F, the test tube 15 can also be supported on the upper part of the adapter 25F, and the stability of holding the test tube 15 can be increased.

As described above, according to the sixth embodiment, the plurality of abutting portions 25r that abut the test tube 15 are formed on the inner circumferential surface 25e of the cylinder 25a at intervals in the circumferential direction, and the abutting portion 25r is formed on the upper portion of the cylinder 25a. Accordingly, even when a gap is formed between the test tube 15 and the adapter 25F due to the structure of the plate spring portion 25n, the abutting portion 25r can be positioned in the gap, thereby stably holding the test tube 15.

Seventh Embodiment

Figure 30:
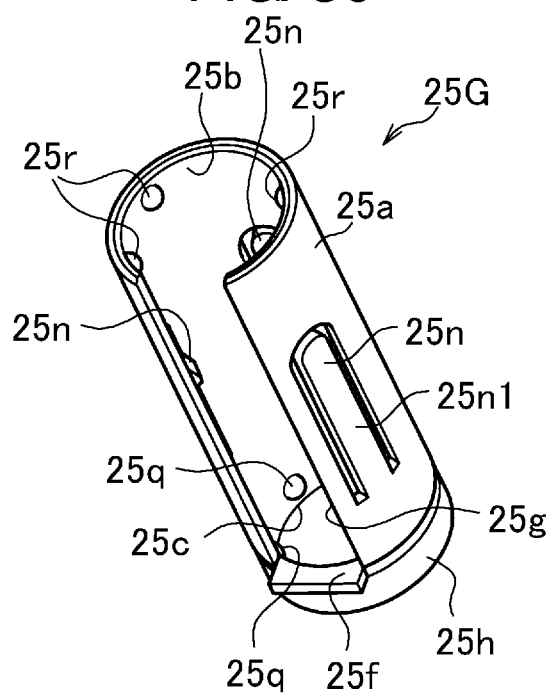
FIG. 30 is a perspective view illustrating an adapter according to a seventh embodiment.

FIG. 30 is a perspective view illustrating an adapter according to a seventh embodiment.

As shown in FIG. 30, an adapter 25G according to the seventh embodiment is one obtained by combining the abutting portion 25q according to the fifth embodiment and the abutting portion 25r according to the sixth embodiment. The abutting portion 25q is formed at a lower part of the cylinder 25a. The abutting portion 25r is formed at an upper portion of the cylinder 25a.

Figure 31:
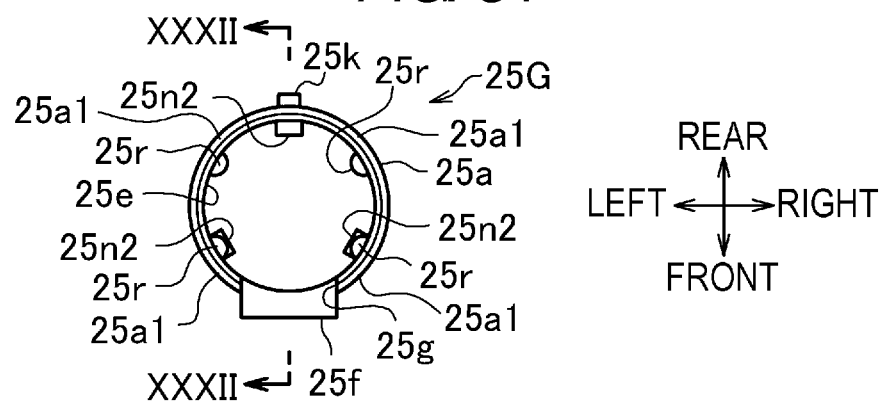
FIG. 31 is a top view illustrating the adapter according to the seventh embodiment.
Figure 32:
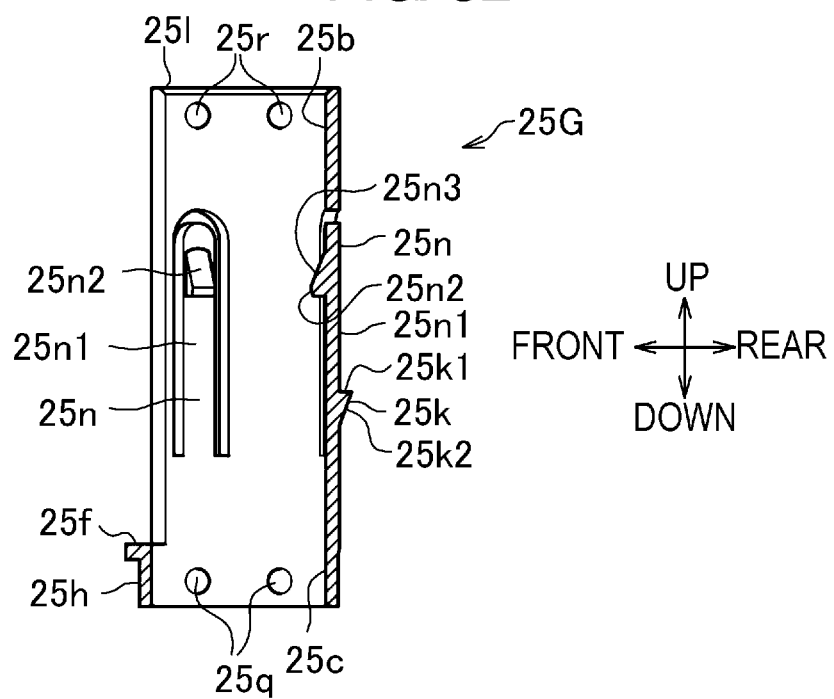
FIG. 32 is a cross-sectional view taken along line XXXII-XXXII of FIG. 30.

FIG. 31 is a top view illustrating the adapter according to the seventh embodiment. FIG. 32 is a cross-sectional view taken along line XXXII-XXXII of FIG. 31.

As shown in FIGS. 31 and 32, the abutting portions 25q and 25r are formed to protrude inward in the radial direction from the inner circumferential surface 25e of the cylinder 25a. Since the abutting portions 25q and 25r are formed at positions where they overlap with each other in the axial direction (vertical direction), only the abutting portion 25r is shown in FIG. 31.

As described above, according to the seventh embodiment, the abutting portions 25q and 25r for supporting the test tube 15 are provided at the upper and lower portions of the adapter 25G. Accordingly, the stability of holding the test tube 15 can be further increased.

According to the seventh embodiment, the abutting portions 25q and 25r for supporting the test tube 15 are provided at the lower and upper portions of the adapter 25G, and the abutting portion 25q is formed higher than the abutting portion 25r. Meanwhile, the test tube 15 is formed with a taper, and is tapered slightly toward the bottom of test tube 15 in some cases. Therefore, by making the abutting portion 25q of lower portion slightly higher than the upper abutting portion 25r, more effect can be exhibited in the stability of holding the test tube 15.

Eighth Embodiment

Figure 34:
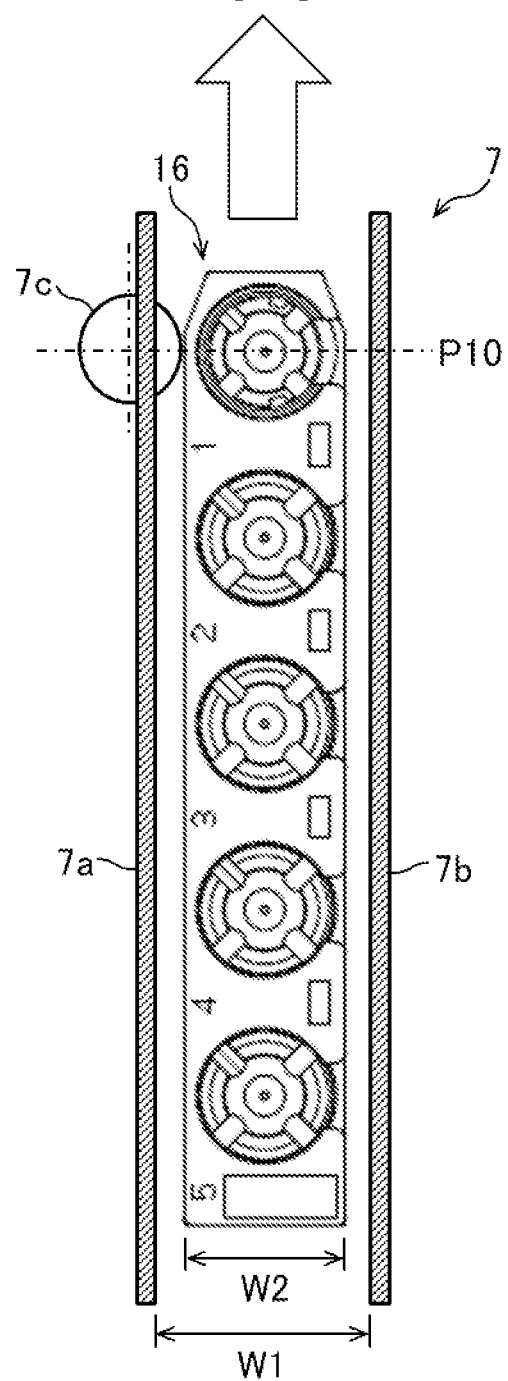
FIG. 34 is a top view illustrating a specimen transport mechanism of a specimen rack.
Figure 35:
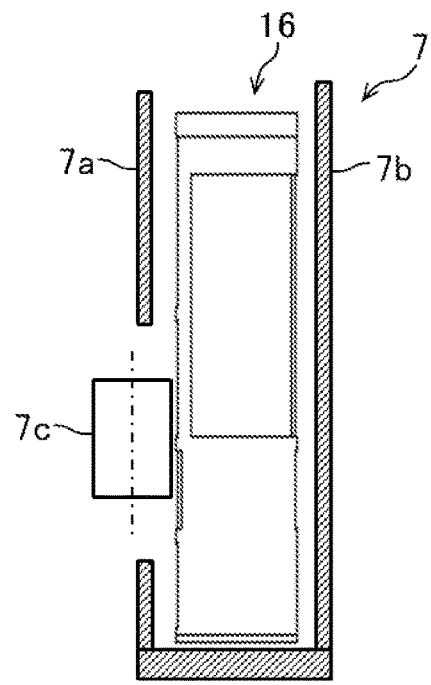
FIG. 35 is a side view illustrating the specimen transport mechanism of the specimen rack.
Figure 36:
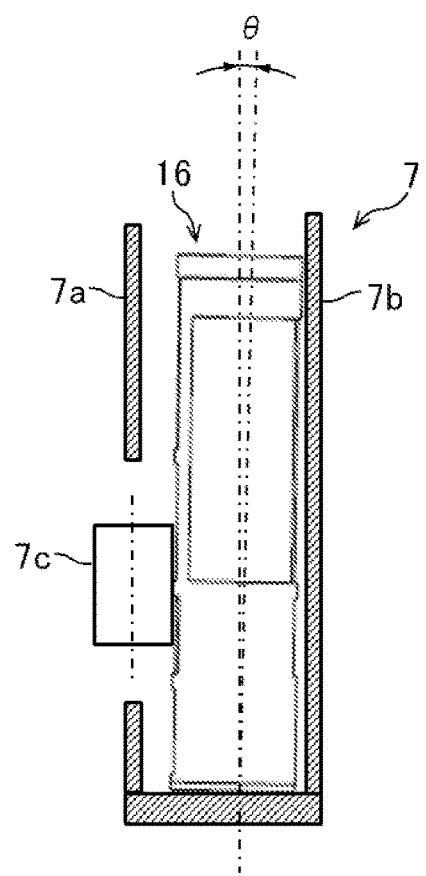
FIG. 36 is a side view illustrating a state of the specimen rack when transport is stopped.

FIG. 34 is a top view illustrating a specimen transport mechanism of a specimen rack, FIG. 35 is a side view illustrating the specimen transport mechanism of the specimen rack, and FIG. 36 is a side view illustrating the state of the specimen rack when the transport is stopped. In FIG. 34, the white arrow indicates the traveling direction of the specimen rack 16.

As shown in FIG. 34, the specimen rack 16 moves between the walls 7a and 7b arranged on the left and right sides of the specimen transport mechanism 7, and is transported to the sample dispensing mechanisms 3 and 4 (see FIG. 1). The distance W1 between the walls 7a and 7b of the specimen transport mechanism 7 is preferably arranged to be larger than the width W2 of the specimen rack 16 so that the specimen rack 16 can operate smoothly. In the specimen rack 16, when the specimen rack 16 slips after the movement is stopped, the specimen suction position P10 deviates. In the small cup 60 (see FIG. 33) described above, or the like, when the specimen suction position P10 of the specimen rack 16 deviates each time, for example, the tips of the sample probes 3a and 4a (see FIG. 1) come into contact with the side surface of the small cup 60, which hinders the dispensing accuracy (see FIG. 33). Therefore, as shown in FIG. 35, a structure in which the specimen transport mechanism 7 is provided with a roller 7c and the side surface of the specimen rack 16 is held down (pressed) by the roller 7c can be used. Note that, in FIG. 34, a spring for holding down the roller 7c is not shown. As a result, the roller 7c holds down the specimen rack 16 after the specimen rack 16 is stopped, so that slipping of the specimen rack 16 can be prevented, thereby ensuring a stable specimen suction position P10.

However, by holding down the side surface of the specimen rack 16 with the roller 7c, the specimen rack 16 is pushed by the roller 7c and biased to one side of the specimen transport mechanism 7, and the specimen rack 16 is tilted by θ as shown in FIG. 36. Here, since the roller 7c pushes the specimen rack so that the pressing force is always constant, the inclination angle θ of the specimen rack 16 is always constant. For example, when a test tube having a length of 100 mm is inserted into the specimen rack 16 and a small cup 60 is placed on the test tube for analysis, the slight inclination of the angle θ will be greatly deviated at the suction position of the sample probes 3a and 4a (see FIG. 1). The amount of deviation is greater when the small cup 60 is placed on a test tube of 100 mm than when it is placed on a test tube of 75 mm.

Figure 37:
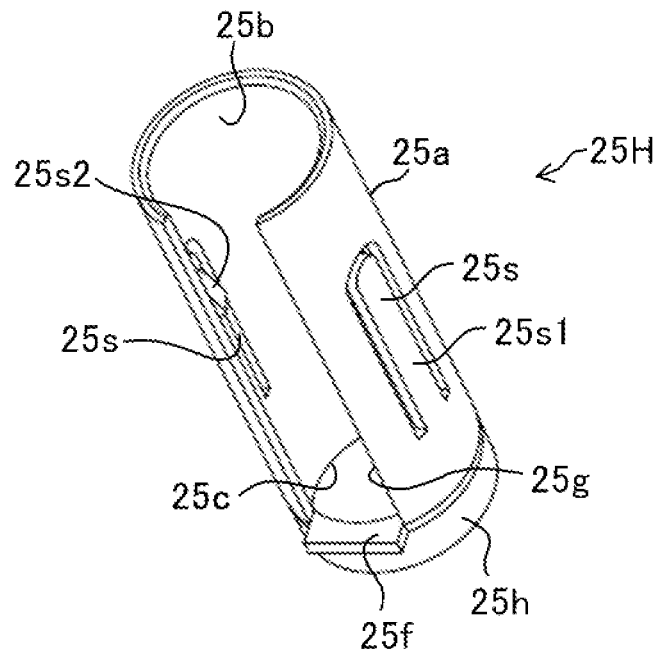
FIG. 37 is a perspective view illustrating an adapter according to an eighth embodiment.
Figure 40:
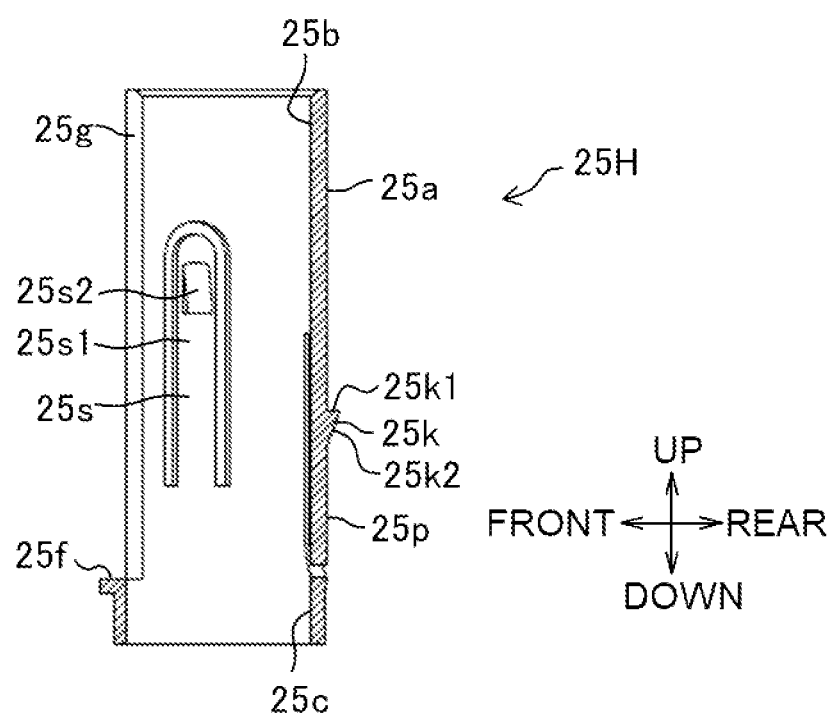
FIG. 40 is a cross-sectional view taken along line XL-XL of FIG. 39.
Figure 41:
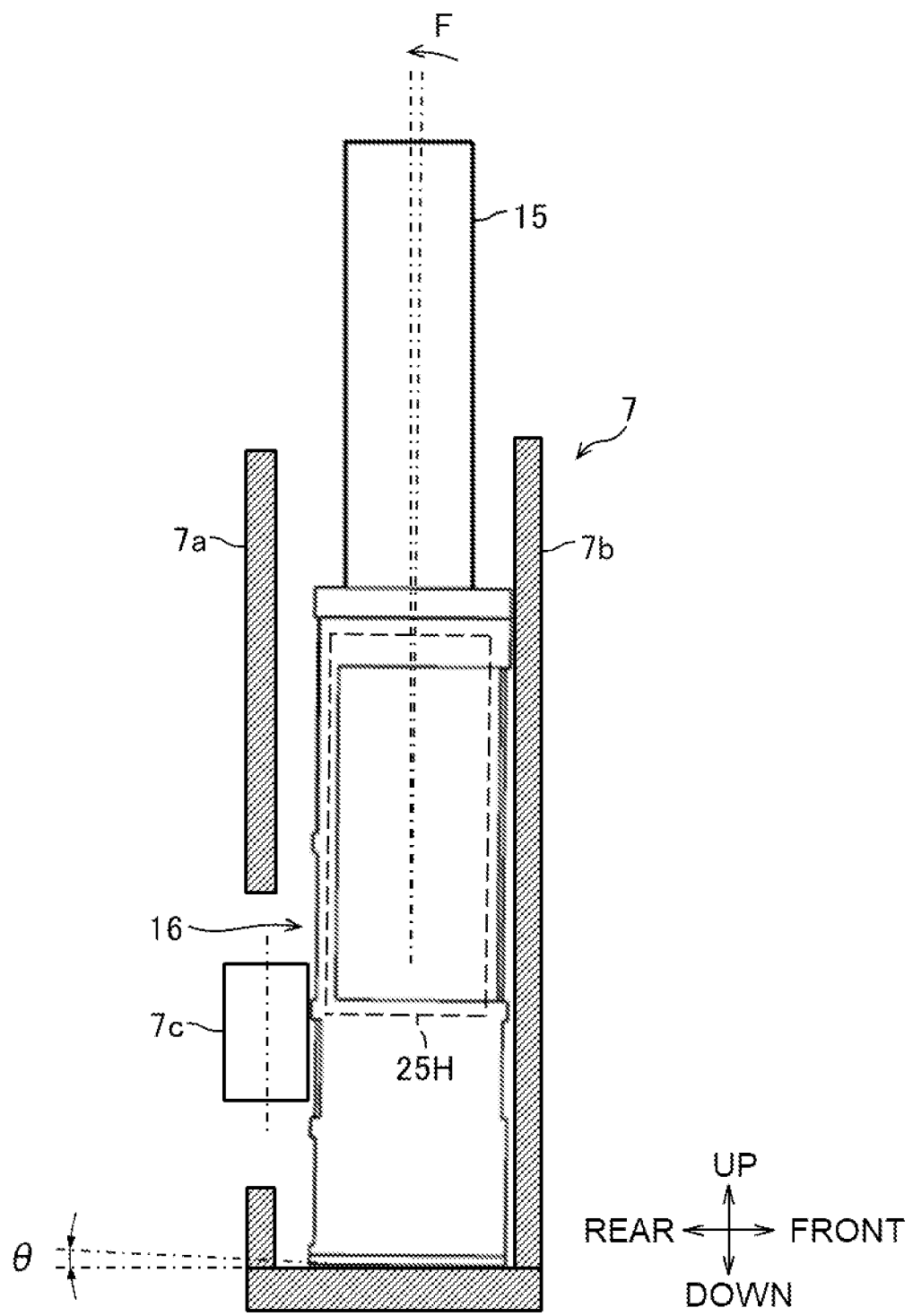
FIG. 41 is a side view illustrating a state where a test tube is inserted into a specimen rack to which the adapter according to the eighth embodiment is mounted.

Therefore, the adapter 25H for correcting the inclination angle θ will be described with reference to FIGS. 37 to 41. FIG. 37 is a perspective view illustrating the adapter according to the eighth embodiment, FIG. 38 is a front view illustrating the adapter according to the eighth embodiment, FIG. 39 is a top view illustrating the adapter according to the eighth embodiment, FIG. 40 is a cross-sectional view taken along line XL-XL of FIG. 39, and FIG. 41 is a side view illustrating a state where a test tube is inserted into a specimen rack to which the adapter according to the eighth embodiment is mounted.

As shown in FIG. 37, the adapter 25H of the eighth embodiment includes the cylinder 25a (wall portion). The cylinder 25a includes plate spring portions 25s and 25s (elastic support portions) that press and support the test tube 15. The plate spring portion 25s is formed at two places. The plate spring portion 25s includes an upward plate portion 25s1 extending in the axial direction (vertical direction) and having a free end on an upper side, and a protrusion portion 25s2 formed to protrude on an inner surface of the upward plate portion 25s1 on the free end side.

Figure 38:
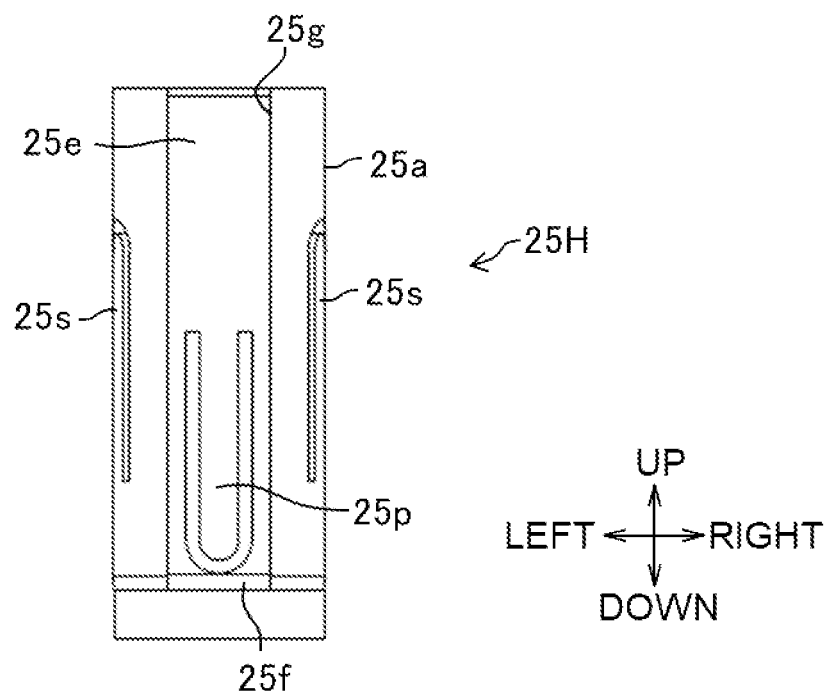
FIG. 38 is a front view illustrating the adapter according to the eighth embodiment.

As shown in FIG. 38, the cylinder 25a includes an inner circumferential surface 25e having an inner diameter larger than an outer diameter of the test tube 15. In the cylinder 25a, the protrusion portion 25s2 formed on the upward plate portion 25s1 protrudes inward (inner diameter side) from the inner circumferential surface 25e of the cylinder 25a.

Figure 39:
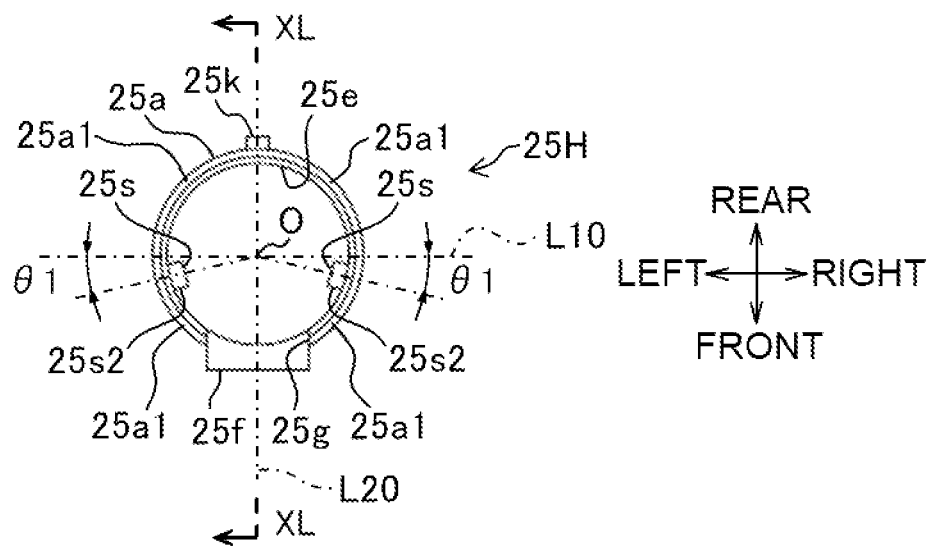
FIG. 39 is a top view illustrating the adapter according to the eighth embodiment.

As shown in FIG. 39, the plate spring portions 25s are formed separately on the left and right sides to interpose the slit 25g therebetween. The plate spring portions 25s are all located on the opposite side (slit 25g side) from an upward plate portion 25p to interpose the center O of the cylinder 25a therebetween. The protrusion portion 25s2 of each plate spring portion 25s is arranged at a position forming an angle θ1 toward the slit 25g side (front side) with respect to the center line L10 extending in the left and right direction through the center O.

As shown in FIG. 40, the upward plate portion 25s1 of the plate spring portion 25s is formed by notching the circumferential wall of the cylinder 25a in an inverted U shape. The protrusion portion 25s2 is located above the center of the cylinder 25a in the axial direction (vertical direction).

The cylinder 25a includes a downward plate portion 25p extending in the axial direction and having a free end on the lower side on the back surface facing the slit 25g. The downward plate portion 25p is formed by notching the circumferential wall of the cylinder 25a in a U shape. The downward plate portion 25p is located closer to the lower side than the upward plate portion 25s1 described above. The free end (lower end) of the downward plate portion 25p extends to the vicinity of the rotation preventing plate 25f in front view (see FIG. 38).

As shown in FIG. 41, the adapter 25H is provided with two plate spring portions 25s (see FIG. 40) for holding the test tube 15 (to support at two points), so that the test tube 15 inserted into the adapter 25H can be tilted to the side where the plate spring portions 25s are not arranged (F direction in FIG. 41, a predetermined direction).

That is, when the test tube 15 inserted in the adapter 25H is desired to be tilted backward, the plate spring portions 25s are preferably arranged in front of the center line L10 in the left and right direction (see FIG. 39), and the plate spring portions 25s are arranged left and right symmetrically to be deviated by θ1 with respect to the center line L20 in the front and rear direction (see FIG. 39). When the plate spring 17 (elastic portion) is attached to the specimen rack 16, the angle θ1 makes it possible to obtain the effect of tilting the test tube 15 in a certain direction (predetermined direction) by arranging the plate springs 25s at positions where the plate springs 25s do not overlap with the plate spring 17.

By arranging the plate spring portions 25s while considering the direction in which the test tube 15 is desired to be tilted with respect to the specimen rack 16 by an angle θ, even when the specimen rack 16 is pushed by the roller 7c and tilted, the test tube 15 can be held vertically at the specimen suction position P10 (see FIG. 34).

The height of the plate spring portion 25s with respect to the test tube 15 is preferably arranged above the lower portion of the cylinder 25a. Pushing the upper part of the test tube 15 with the plate spring portion 25s is more stable than to push the lower part of the test tube 15 with the plate spring portion 25s, and the test tube 15 can be tilted and held with respect to the specimen rack 16.

The automatic analysis device 100 of the present embodiment includes the specimen rack 16 equipped with the adapters 25A to 25H, the specimen transporting means 7 (transporting means) for transporting the specimen rack 16, the sample dispensing mechanisms 3 and 4 for dispensing the specimen SP (specimen) from the test tube 15 (other reaction containers) mounted on the specimen rack 16 into the reaction container 1a, the reagent dispensing mechanisms 5 and 6 for dispensing reagents into the reaction container 1a into which the specimen SP is dispensed, and the analyzing unit 10 for analyzing a mixed liquor (liquid) in which the specimen SP and the reagent are mixed. Accordingly, even when the small cup 60 in which the specimen SP is charged is applied to the test tube 15, the test tube 15 is prevented from being tilted in the specimen rack 16. Therefore, the amount required for analysis can be sucked into the probe 70 without erroneously detecting the liquid level of the specimen SP.

The present invention is not limited to the embodiments described above, and includes various modified examples. For example, the adapter 25A according to the first embodiment using the plate spring 17 of the specimen rack 16 may be configured by applying the fifth to seventh embodiments. Further, the adapter 25B may be configured by applying the second embodiment to the seventh embodiment.

The case where the wall portion 25a1 for disabling the function of the plate spring 17 of the specimen rack 16 is provided in the adapters 25B to 25H has been described as an example, but the embodiment may be configured such that the plate spring portion 25n is provided on the cylinder 25a at a position facing the plate spring 17, and the plate spring portion 25n is pressed inward in the radial direction by the elastic force of the plate spring 17, so that the test tube 15 is held by the plate spring portion 25n.

REFERENCE SIGNS LIST

1: reaction disk
1a: reaction container
2: reagent disk
2a: reagent bottle
3, 4: sample dispensing mechanism (specimen dispensing mechanism)
3a, 4a: sample probe
5, 6: reagent dispensing mechanism
5a, 6a: reagent probe
7: specimen transport mechanism (transport mechanism)
8, 9: stirring mechanism
10: analyzing unit
10a: light source
10b: spectrophotometer
11, 12: syringe for specimen
13, 14: syringe for reagent
15: test tube (another specimen container)
16: specimen rack
16a: specimen rack main body
16b: accommodation portion
16c: insertion hole (upper opening)
16d: side opening
16e: upper circumferential surface portion
16f: lower circumferential surface portion
16t: opening
17: plate spring (elastic portion)
18: retaining portion
20: cleaning mechanism
25A, 25B, 25C, 25D, 25E, 25F, 25G, 25H: adapter (adapter for specimen rack)
25a: cylinder
25a1: wall portion
25d: outer circumferential surface
25e: inner circumferential surface
25f: rotation preventing plate (protrusion portion)
25g: slit
25i, 25m: notch portion
25n, 25o, 25s: plate spring portion (elastic support portion)
25n1, 25o1: upward plate portion
25n2, 25o2: protrusion portion
25n4: groove
25n5: protrusion
25j: downward plate portion
25k: retaining protrusion
25p: downward plate portion
25q: abutting portion (abutting portion of lower portion)
25r: abutting portion (abutting portion of upper portion)
40: cleaning pump
41, 42, 43, 44, 45, 46: cleaning tank
51: controller
60: small cup
60a: inner wall
100: automatic analysis device
SP: specimen (specimen)

The invention claimed is:

1. A specimen rack comprising:
a specimen rack main body into which a specimen container is inserted through an upper opening;
a plurality of elastic portions that are provided in the specimen rack main body and press and hold the specimen container; and
an adapter that is inserted through the upper opening, wherein
the adapter includes a cylinder that is inserted through the upper opening,
the cylinder includes a notch portion that is formed in a portion where each of the elastic portions comes into contact with the specimen container such that the elastic portion penetrates into the notch portion and holds another specimen container having a smaller outer diameter than the upper opening, and
the plurality of elastic portions are configured to cancel out each other's reaction forces to hold the other specimen container at the center of the cylinder and vertical.

2. A specimen rack comprising:
a specimen rack main body into which a specimen container is inserted through an upper opening;
a plurality of elastic portions that are provided in the specimen rack main body and press and hold the specimen container; and
an adapter that is inserted through the upper opening, wherein
the adapter includes a cylinder that is inserted through the upper opening,
the cylinder includes a wall portion that faces each of the elastic portions, and an elastic support portion that presses and supports another specimen container having a smaller outer diameter than the upper opening,
the elastic support portion includes a plurality of plate springs that are arranged at regular intervals in a circumferential direction and each of the plate springs includes an upward plate portion that extends in an axial direction and of which an upper side forms a free end, and a protrusion portion that is formed to protrude to an inner surface of the upward plate portion on a free end side,
on an outer circumferential surface of the cylinder, a retaining protrusion that prevents the cylinder that has engaged with the specimen rack main body from being separated from the specimen rack main body is formed, and
the retaining protrusion is formed on an outer surface of the upward plate portion.

3. The specimen rack according to claim 2, wherein the protrusion portion includes a groove that is recessed toward an inside in a radial direction.

4. The specimen rack according to claim 2, wherein the cylinder includes a downward plate portion that extends in an axial direction and of which a lower side forms a free end, and
on an outer surface of the downward plate portion, a retaining protrusion that prevents the cylinder from being separated from the specimen rack main body is formed.

5. The specimen rack according to claim 4, wherein the upward plate portion is positioned above the downward plate portion.

6. The specimen rack according to claim 1, wherein
on an inner wall surface of the cylinder, a plurality of abutting portions, which abut against the other specimen container, are formed at intervals in a circumferential direction.

7. The specimen rack according to claim 6, wherein the abutting portions are formed on an upper portion and/or a lower portion of the cylinder.

8. The specimen rack according to claim 6, wherein
the abutting portions are formed on an upper portion and a lower portion of the cylinder, and
the abutting portions of the lower portion are formed to be higher than the abutting portions of the upper portion.

9. The specimen rack according to claim 1, wherein
the cylinder includes a slit that is formed along a side opening of the specimen rack main body, and a protrusion portion that protrudes toward the side opening.

10. The specimen rack according to claim 2, wherein the elastic support portion is supported at two points.

11. An automatic analysis device comprising:
the specimen rack according to claim 1;
a transport unit for transporting the specimen rack;
a specimen dispensing mechanism that dispenses a specimen into a reaction container from the other specimen container mounted on the specimen rack;
a reagent dispensing mechanism that dispenses a reagent into the reaction container into which the specimen is dispensed; and
an analyzing unit that analyzes a liquid in which the specimen and the reagent are mixed with each other.

12. The specimen rack according to claim 2, wherein
on an inner wall surface of the cylinder, a plurality of abutting portions, which abut against the other specimen container, are formed at intervals in a circumferential direction.

13. The specimen rack according to claim 2, wherein
the cylinder includes a slit that is formed along a side opening of the specimen rack main body, and a protrusion portion that protrudes toward the side opening.

14. An automatic analysis device comprising:
the specimen rack according to claim 2;
a transport unit for transporting the specimen rack;
a specimen dispensing mechanism that dispenses a specimen into a reaction container from the other specimen container mounted on the specimen rack;
a reagent dispensing mechanism that dispenses a reagent into the reaction container into which the specimen is dispensed; and
an analyzing unit that analyzes a liquid in which the specimen and the reagent are mixed with each other.

* * * * *